United States Patent [19]

Carpenter

[11] 4,161,876

[45] Jul. 24, 1979

[54] MASS PROPERTIES MEASUREMENT SYSTEM

[75] Inventor: David A. Carpenter, Parkton, Md.

[73] Assignee: MRC Corporation, Hunt Valley, Md.

[21] Appl. No.: 887,606

[22] Filed: Mar. 17, 1978

[51] Int. Cl.² ............................................. G01M 1/12
[52] U.S. Cl. ......................................... 73/65; 73/580
[58] Field of Search ................... 73/65, 579, 580, 383; 177/210 FP

[56] References Cited

U.S. PATENT DOCUMENTS

| | | | |
|---|---|---|---|
| 3,019,387 | 1/1962 | Rowe | 73/579 X |
| 3,555,886 | 1/1971 | Thornton | 73/580 |
| 3,693,413 | 9/1972 | Boynton | 73/65 |

*Primary Examiner*—James J. Gill
*Attorney, Agent, or Firm*—LeBlanc & Shur

[57] ABSTRACT

The mass properties measurement apparatus of this invention includes a pair of opposed bearing assemblies, each comprising a fixed bearing and a movable journal, and a radially rigid connection between the movable journals located on an axis with a single degree of freedom, which is rotation. A test object support table is fixed to one journal for rotational movement therewith, the plane of the surface of the support table being perpendicular to the rotational axis. A torsion wire coincident with the rotational axis is fixed at one end to the one journal for rotation with the support table and is fixed at its other end against rotation with the support table, thereby creating a torsional pendulum which permits oscillatory movement of the support table. Means are provided for measuring successive oscillation periods of the support table for determining the center of gravity and principal axis moments of inertia of a test object on the support table. Finally, a fail-safe caging mechanism is provided. This device engages the shaft under controlled conditions if gas pressure falls below acceptable values thus protecting the bearing surfaces from damage and providing an orderly shutdown.

52 Claims, 13 Drawing Figures

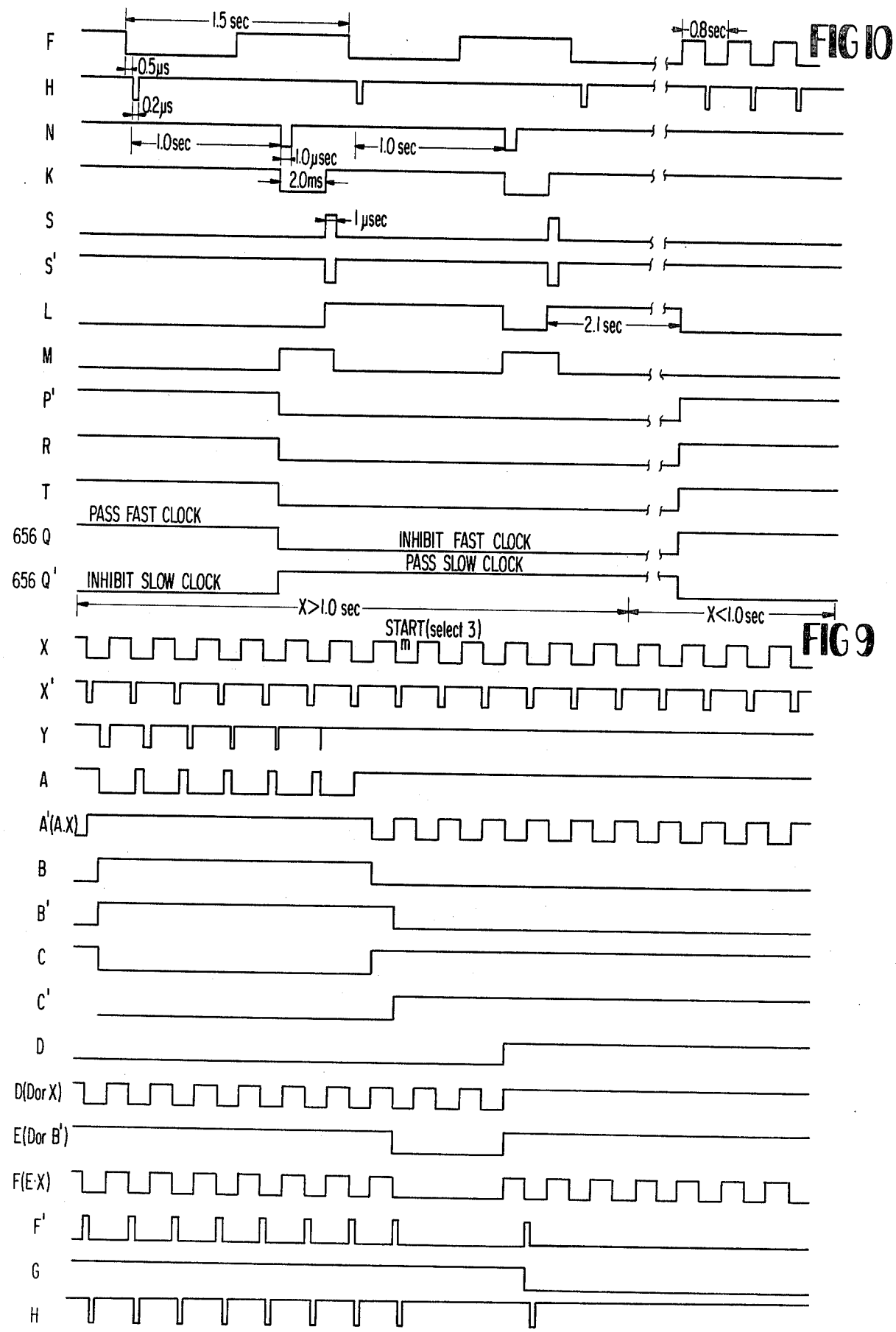

flange to connect to the system support structure for rigid attachment to the floor.

A single chopper blade is attached to the shaft. As the shaft rotates, the chopper blade interrupts the light path from the light source to the photosensor in the pickup head.

A fail-safe caging mechanism is also provided. This device engages the shaft under controlled conditions if gas pressure falls below acceptable values thus protecting the bearing surface from damage and providing an orderly shutdown.

The result of the design approach described herein is a capability to measure MOI with extreme accuracy while reacting moments. This feature enables off-axis movement of the specimen to be effectively utilized in measuring center-of-mass and mass, as awll as principal axis moment of intertia.

All electronics and controls for the mass properties measurement system of this invention are contained within a separate electronics unit with the exception of the photo pickup head. An interconnection cable and a power cable are provided. The power connection cable may be a 6 foot, 3 conductor line cord, CORCOM Part Number 80-1245, which includes a filter. There may be two Accopian 5E25 5 vdc supplies in the unit. One supplies the photo pickup head and pressurized gas solenoid valve at the bearing assembly; the other supplies the fan motor and measurement electronics.

The electronics are organized into three groups roughly divided into three logic assemblies: the timing-/interface logic, the decoder/counter logic, and the display logic. System timing is derived from a 20 MHz source which is divided down to provide two clocks: a fast clock (1.0 MHz) and a slow clock (0.1 MHz). A decision making circuit in the timing/interface logic selects which clock frequency to use based on the duration of the mechanical oscillation period. The determination is based on a one-second test period which is derived from the 20 MHz clock. For longer periods, the slow clock is used.

The photo-sensor signals are supplied by twisted pair. There are two sensors in the pickup head and their signals are referred to as the "set" and "reset" signals. The set signal corresponds to any displacement of the chopper blade sufficient to produce a logical transition; the reset signal controls the operation of the counter so that only oscillations of proper mechanical amplitude are used.

A thumbwheel switch on the front panel permits selection of the number of oscillations used for a particular measurement; the selectable numbers are one through nine. For a given selection, counts are accumulated until the number of cycles matches the selected numbers. The average value is internally computed by division.

The decoder/counter logic receives the clock signals associated with a timing period and generates the display driver signals and provides signals for the external computer interface.

The display decimal position is user selectable from a front panel switch. For short periods, less than one second, the ".XX" position would be used. For longer periods, the "X.X" position is used. There is an auto ranging position which automatically selects from between the ".XX" and "X.X" choices. There is also an overflow indicator which is energized when a one-bit shift register which acts as an overflow memory generates an output-input to the shift register from an overflow detection register.

The display contains 6 full characters, each driven by a separate decoder component located in the decoder/counter logic. Also on the front panel are the "ON-OFF" switch and a bearing status display which shows if the bearing suspension is "CAGED" or "ON AIR".

The external computer interface may be an AMPHENOL Part Number 57-30500 "Blue Ribbon" receptacle which has 50 contacts. The signals provided at this receptacle are 24 data signals, a data ready level, a decimal point level, and signal reference grounds. The signals are transistor—transistor logic (TTL) compatible.

The basic idea behind mass properties measurement techniques of this invention makes use of the extremely accurate moment of inertia (MOI) measurement capability of the herein disclosed apparatus. The MOI measured is a function of the principle MOI, the mass and the position of the test specimen. Successive measurements of MOI of the same specimen at different positions enables deduction of mass and center-of-mass of the specimen, in addition to the principal MOI of the test specimen. No load cells or other force measuring components are required. Only oscillation period measurement is required to determine these mass properties.

The specimen is fixed to the machine table, which can rotate through 90° in successive increments. The table is detented or otherwise arranged to fix the quadrature table positions. It is noted that any desired degree of rotation can be used; quadrature has been selected for simplicity and convenience. The axis of table rotation is displaced from the bearing axis, so that MOI measurement is made from an axis different from the table rotation axis. The basic equation utilized as:

$$I = I_o + Mr^2,$$

where:
 I = total MOI measured for specimen
 $I_o$ = principal MOI of specimen
 M = mass of specimen
 r = distance between center-of-mass of specimen and the MOI meas. axis.

By changing r through the successive 90° rotations of the table, each time measuring a new I, it is possible to derive four equations based on the one shown. The four unknowns are $I_o$, M, $\bar{x}$ and $\bar{y}$, where $\bar{x}$ and $\bar{y}$ are the table coordinates for the center-of-mass of the specimen. Using the four I measurements, the $I_o$, M, $\bar{x}$ and $\bar{y}$ for that specimen can be uniquely determined.

Tests to date on apparatus built according to this specification indicate that $I_o$ can be determined within ¼%, $\bar{x}$ and $\bar{y}$ can be determined within several mils and M can be determined within less than 1%. Careful use of the system can yield M measurements as good as ¼%.

Further, fabrication of said system from zero thermal expansion coefficient material may improve accuracies by an order of magnitude. Vacuum operation of the system will yield further improvement.

Further features, advantages and objects of this invention will become apparent from the detailed description of a preferred embodiment which follows.

MASS PROPERTIES MEASUREMENT SYSTEM

BACKGROUND OF THE INVENTION

1. Field of the Invention

Figure 1:
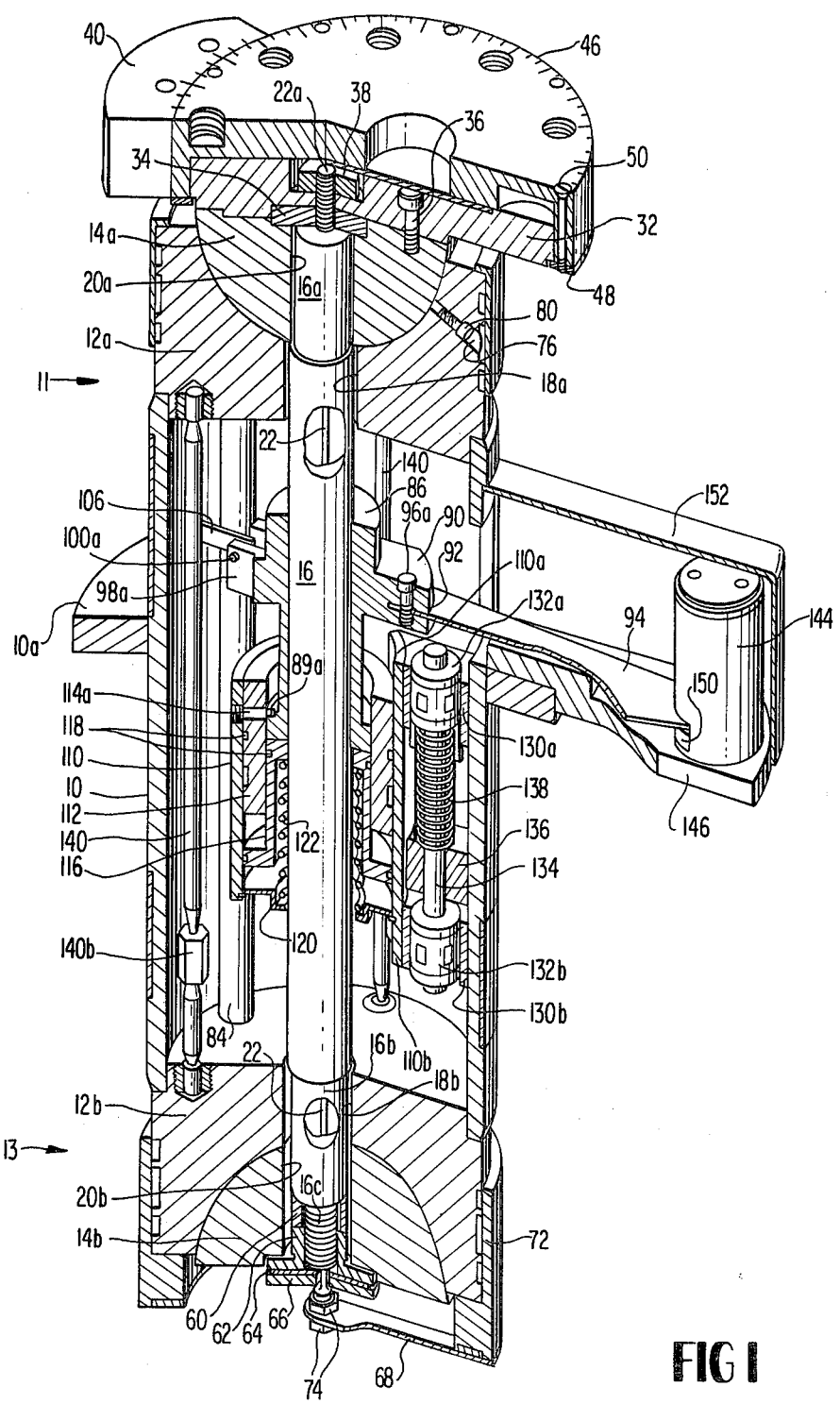
FIG. 1 is a part sectional view of the gas-bearing measurement apparatus.

The present invention relates to apparatus for measuring the mass properties of an object. More specifically, the invention relates to a gas-bearing suspension table and an electronics display/control unit for precisely determining rotational moments of inertia, center of gravity, and mass of items attached to the gas-bearing suspension table.

The apparatus of this invention employs monofilar torsional pendulum techniques for the determination of mass and distributed mass properties of a body. Using measured period data, the center of gravity location and principal axis moments of inertia can be accurately determined.

The basic method used in the mass properties measurement system of this invention to determine center of gravity and moment of inertia is the inverted torsional pendulum, where the test specimen is oscillated and the oscillation period measured. This principal has been widely used for many years; however, this invention is the first to recognize that the oscillation period measurements can be used to determine the center of mass coordinates and the mass of the specimen or test object.

2. Description of the Prior Art

Heretofore, inverted torsional pendulum measuring systems have included devices such as described in U.S. Pat. No. 3,693,413 issued Sept. 26, 1972 to R. S. Boynton and in Phillips, M. S., "Moment of Inertia System", Instruments and Control Systems, November 1966, pages 85–89. In apparatus of the Boynton type, the torsion wire provides the sole support for the test object mounting surface; the test object itself is mounted so that the rotational axis of the measurement system passes through the center of gravity of the test object. In such a system, the center of gravity of the test object must have been previously determined. Moreover, if the test object should be mounted such that its center of gravity is not coincident with the rotational axis of the system, the supporting torsion wire will be subject to severe lateral stress, resulting in measurement errors.

In the Phillips apparatus, the torsion rod is inserted into the specimen support table and aligned vertically after the test object has been aligned on the tables so that the axis about which the moment of inertia is to be determined is over the center of the table. The torsion rod is always inserted after the object is on the table and after the air pressure to the air bearing has been regulated to eliminate any compressive or tensile loads on the torsion rod. A principal disadvantage of test apparatus of the Phillips type is that it requires constant readjustment of the torsion rod each time a measurement on a different test object is to be made.

It is a feature and object of this invention to provide a gas-bearing mass properties measurement system which is simple to maintain and operate and with which the center of gravity and moments of inertia of a test object can be easily measured.

Other objects and features of this invention include:

1. A dual gas-bearing inverted torsional pendulum mass properties measuring apparatus.

2. A dual gas-bearing mass properties measurement apparatus capable of operating in terrestrial and extraterrestrial environments, including gravitationless environments found in manned spacecraft, such as orbiting space laboratories.

3. A mass-properties measurement apparatus in which a selected number of oscillation periods can be measured and averaged for each of several sets of angular coordinates to permit determination of the center of gravity and principal axis moment of inertia of a test object.

4. A dual gas-bearing mass-properties measurement system design which enhances stiffness and moment-carrying capability and in which moments applied as a result of off-axis loading have litte or no effect on the torsion wire.

5. A dual spherical gas-bearing mass properties measurement apparatus.

SUMMARY OF THE INVENTION

The mass properties measurement apparatus of this invention includes a pair of opposed bearing assemblies, each comprising a fixed bearing and a movable journal, and a rigid connection between the movable journals located on an axis with a single degree of freedom, which is rotation. A test object support table is fixed to one journal for rotational movement therewith, the plane of the surface of the support table being perpendicular to the rotational axis. A torsion wire coincident with the rotational axis is fixed at one end to the one journal for rotation with the support table and is fixed at its other end against rotation with the support table, thereby creating a torsional pendulum which permits oscillatory movement of the support table. Finally, means are provided for measuring successive oscillation periods of the support table for determining the center of gravity and principal axis moments of inertia of a test object on the support table.

More specifically, the gas-bearing system of this invention consists of two hemispherical journals mounted at either end of a hollow shaft. The top face of the upper journal supports the measurement table. The hemispherical bearings for the journals are rigidly mounted to the machine frame. The gas bearings face away from one another and are slightly preloaded to ensure uniform seating and load distribution on the bearings. The bearing preload is adjustable.

The torsional element is located concentrically within the hollow shaft. It is attached to the upper journal at one end and the machine frame at the other. The upper journal and measurement table are machined with circular and linear ways which permit the table to be rotated and adjusted radially on the journal. FIG. 1 shows only circular. Linear ways (in addition) facilitate easy determination of TEST ITEM MASS.

The table axis of rotation is offset from the journal axis of rotation by a known distance to obtain rotation and translation of a test object located on the measurements table.

The torsion wire is also preloaded so that an accurately controlled tension is maintained in the wire at all times. The wire preload is independent of the bearing preload, due to the high stiffness achieved in the design. Thus, moments applied as a result of off-axis loading are reacted without influencing the torsion wire.

Figure 2:
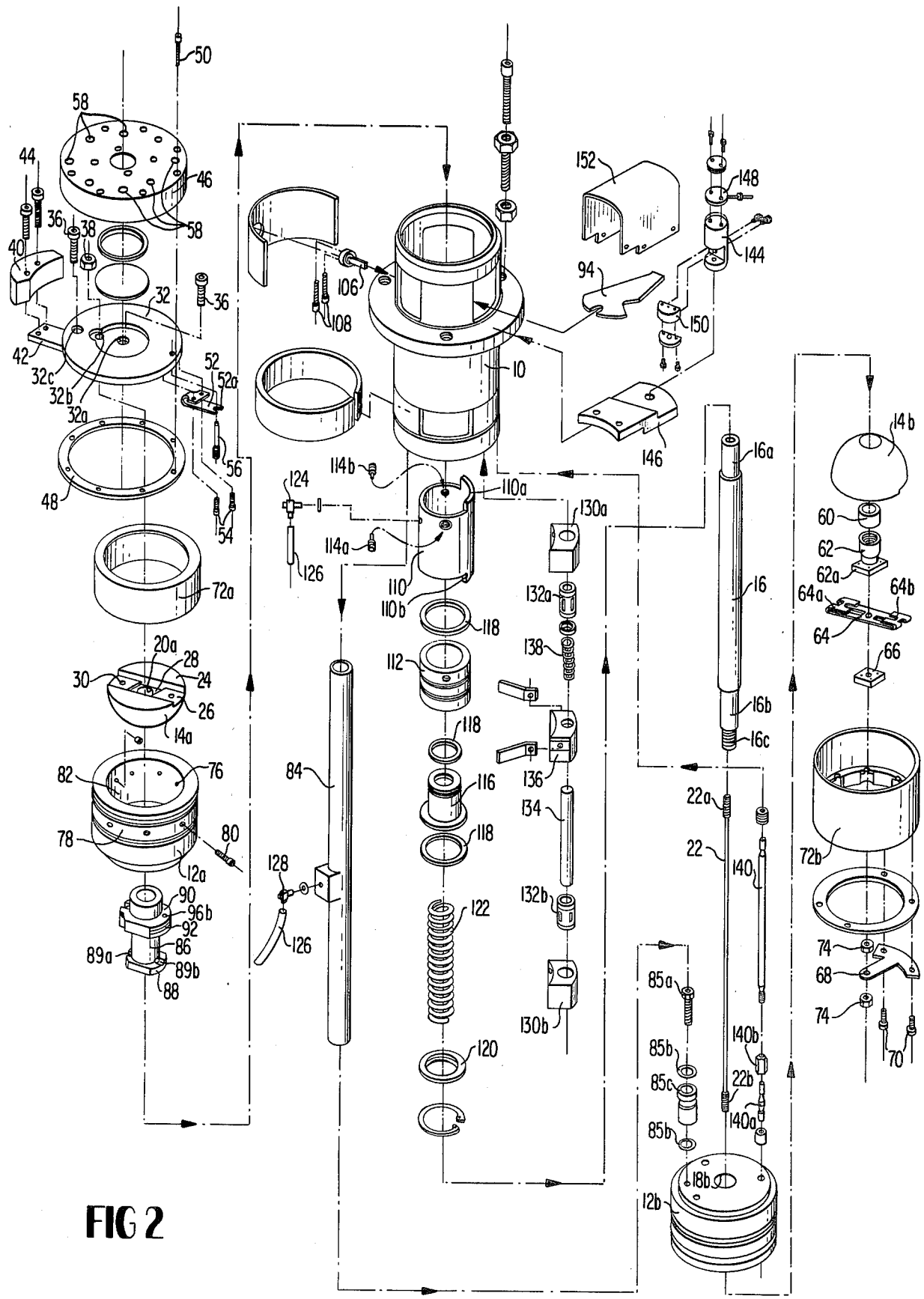
Figure 3:
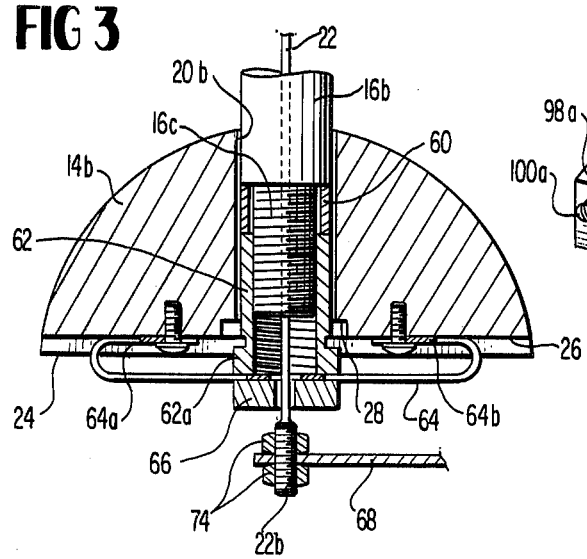
Figure 4:
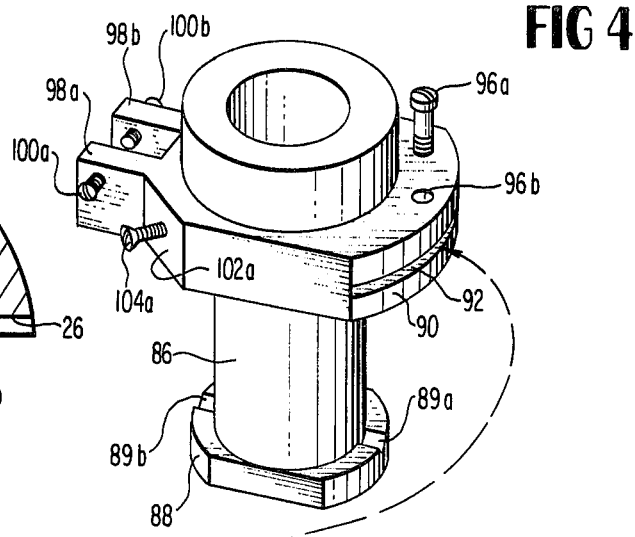
Figure 5:
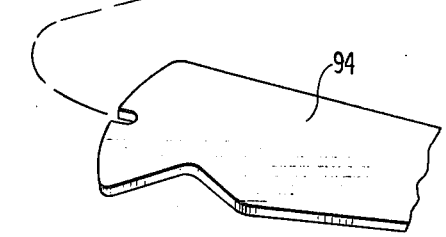
Figure 13:
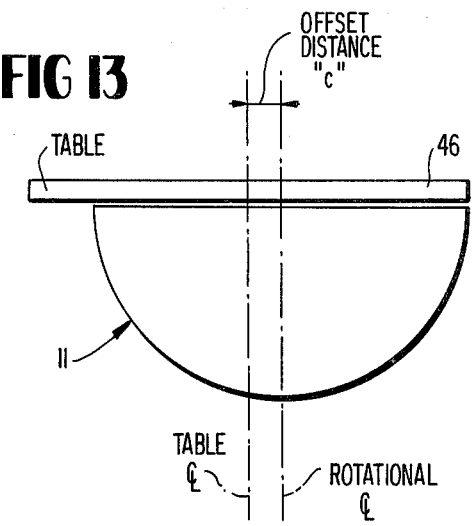
Figure 12:
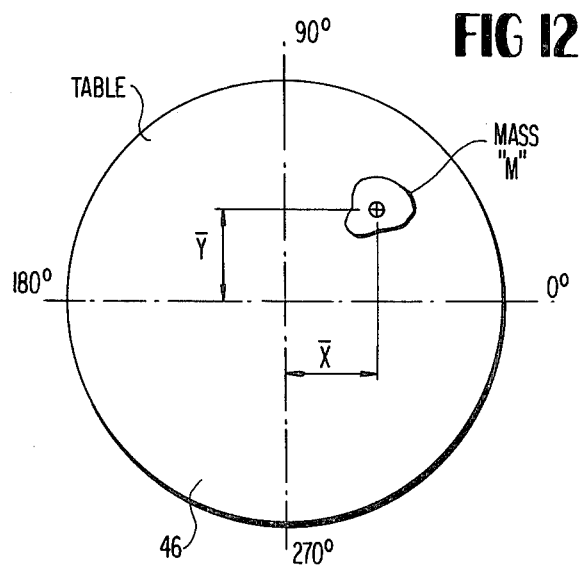
Figure 6:
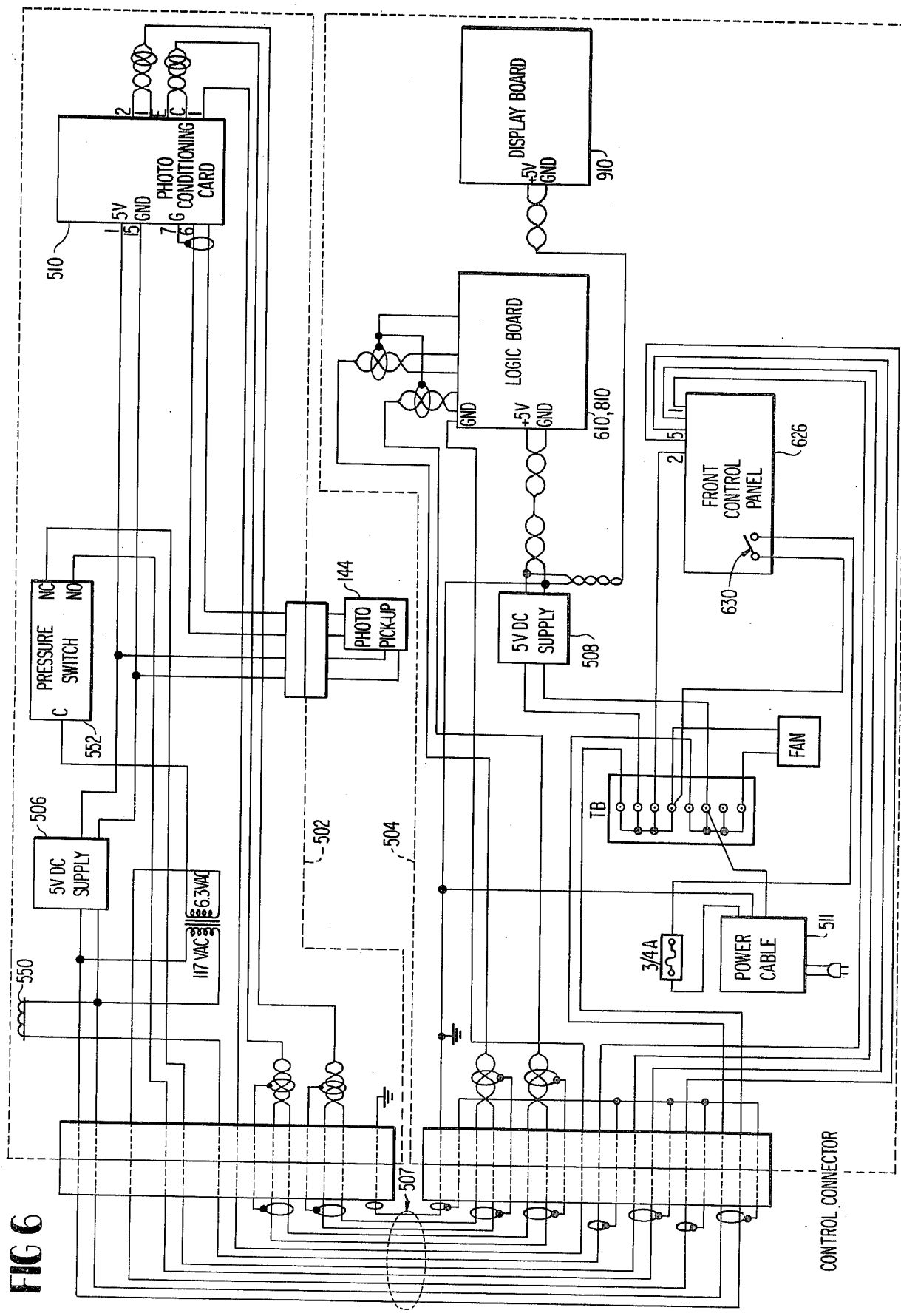
Figure 7:
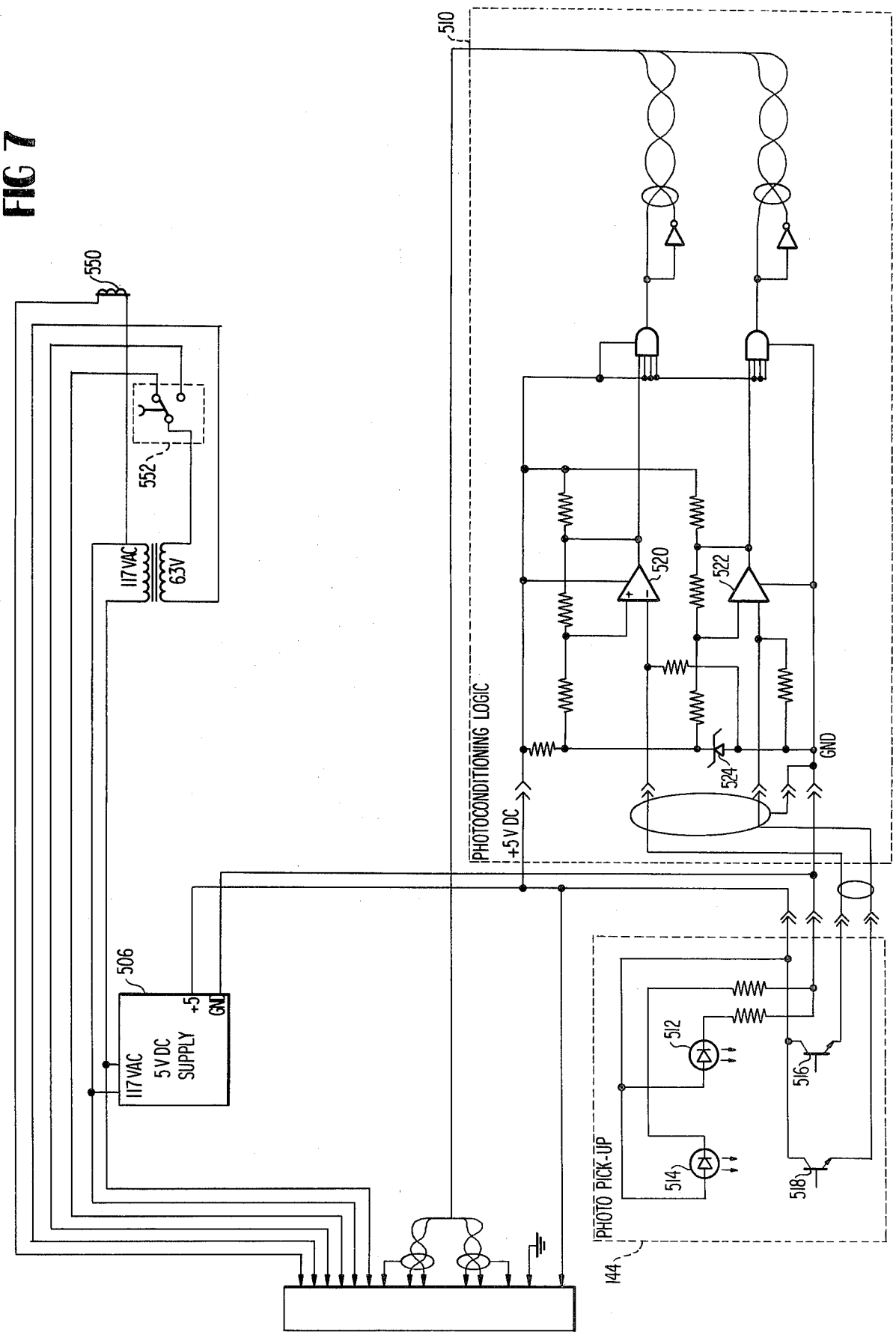
Figure 8A:
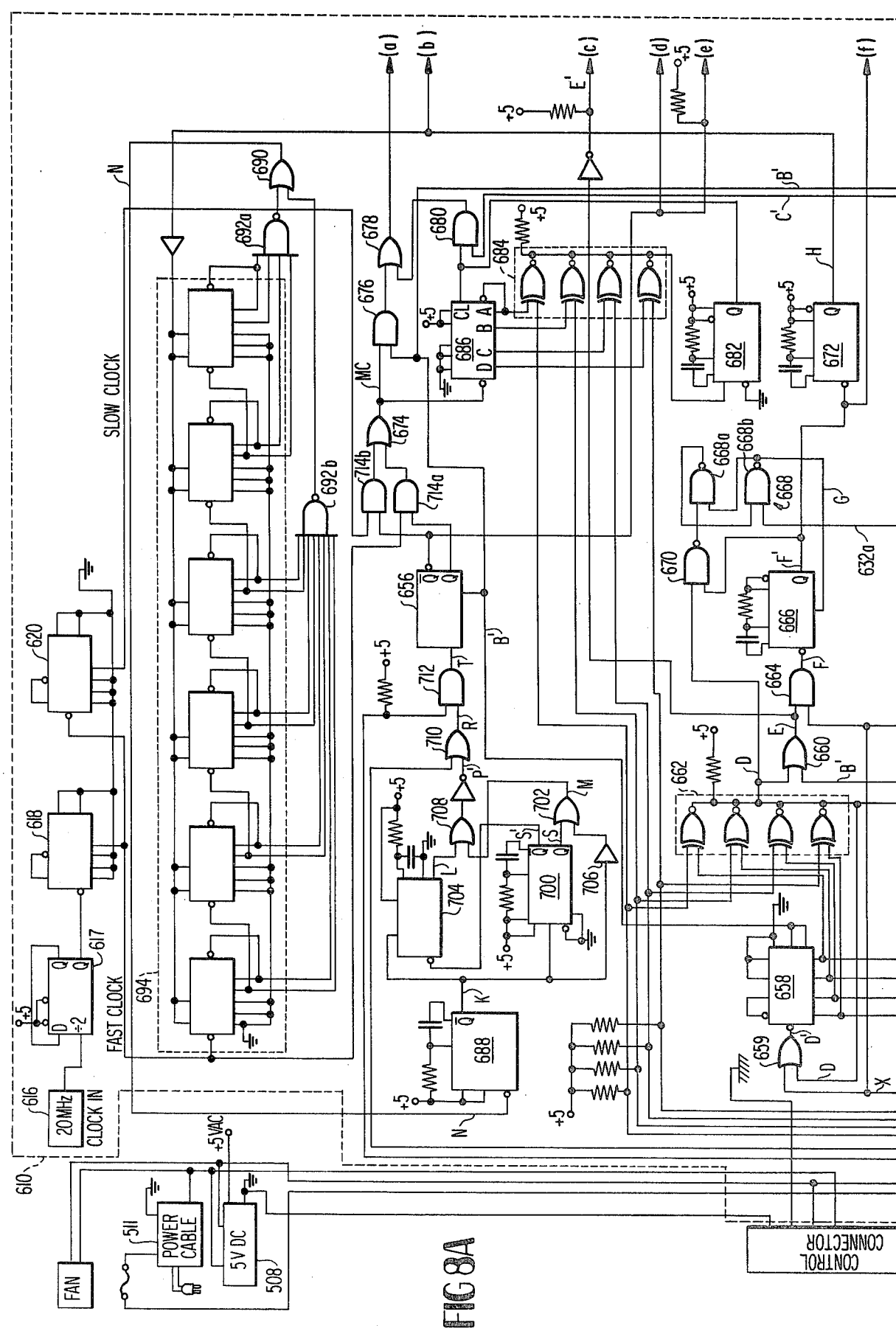
Figure 8B:
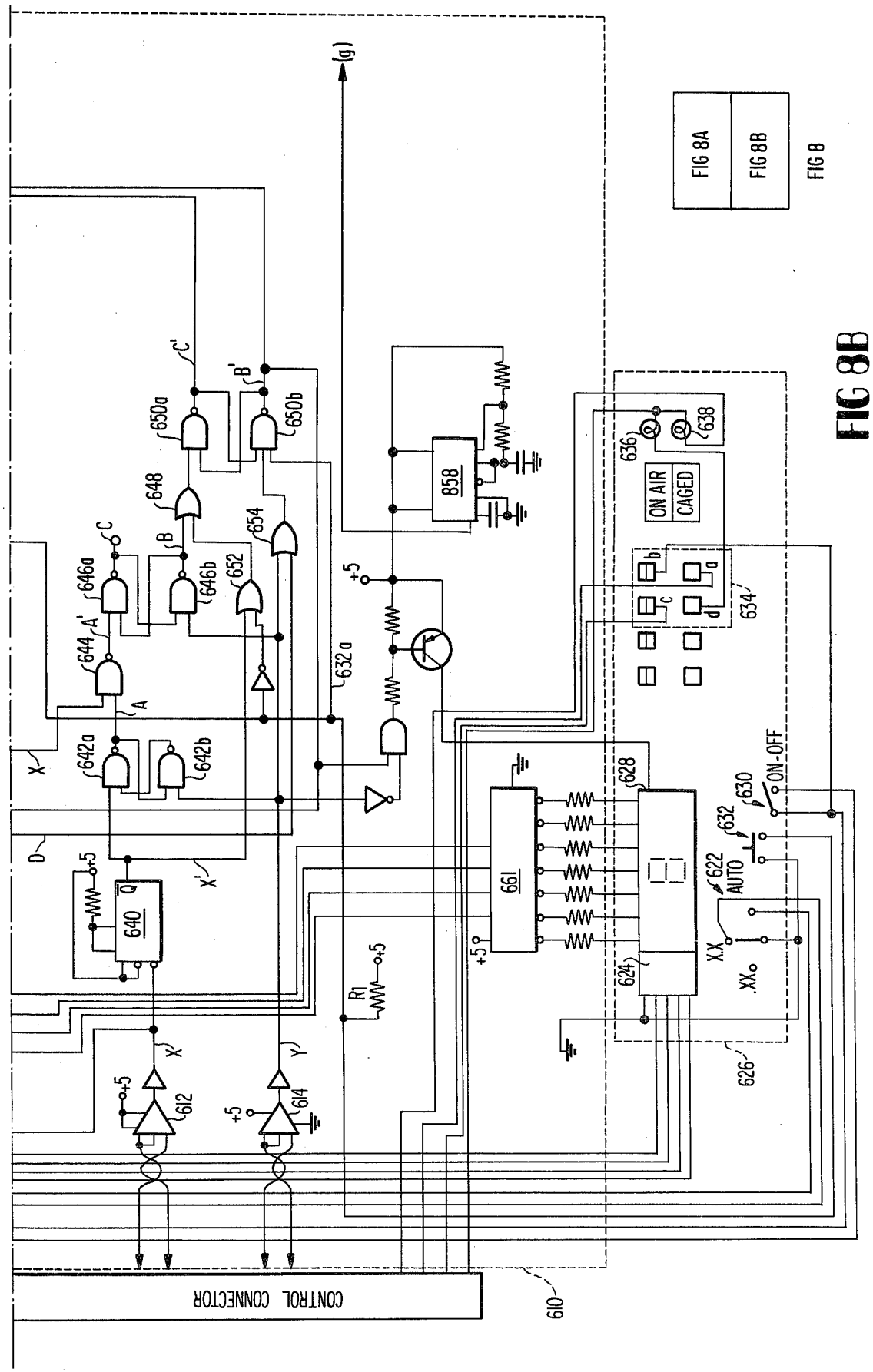
Figures 11, 11B:
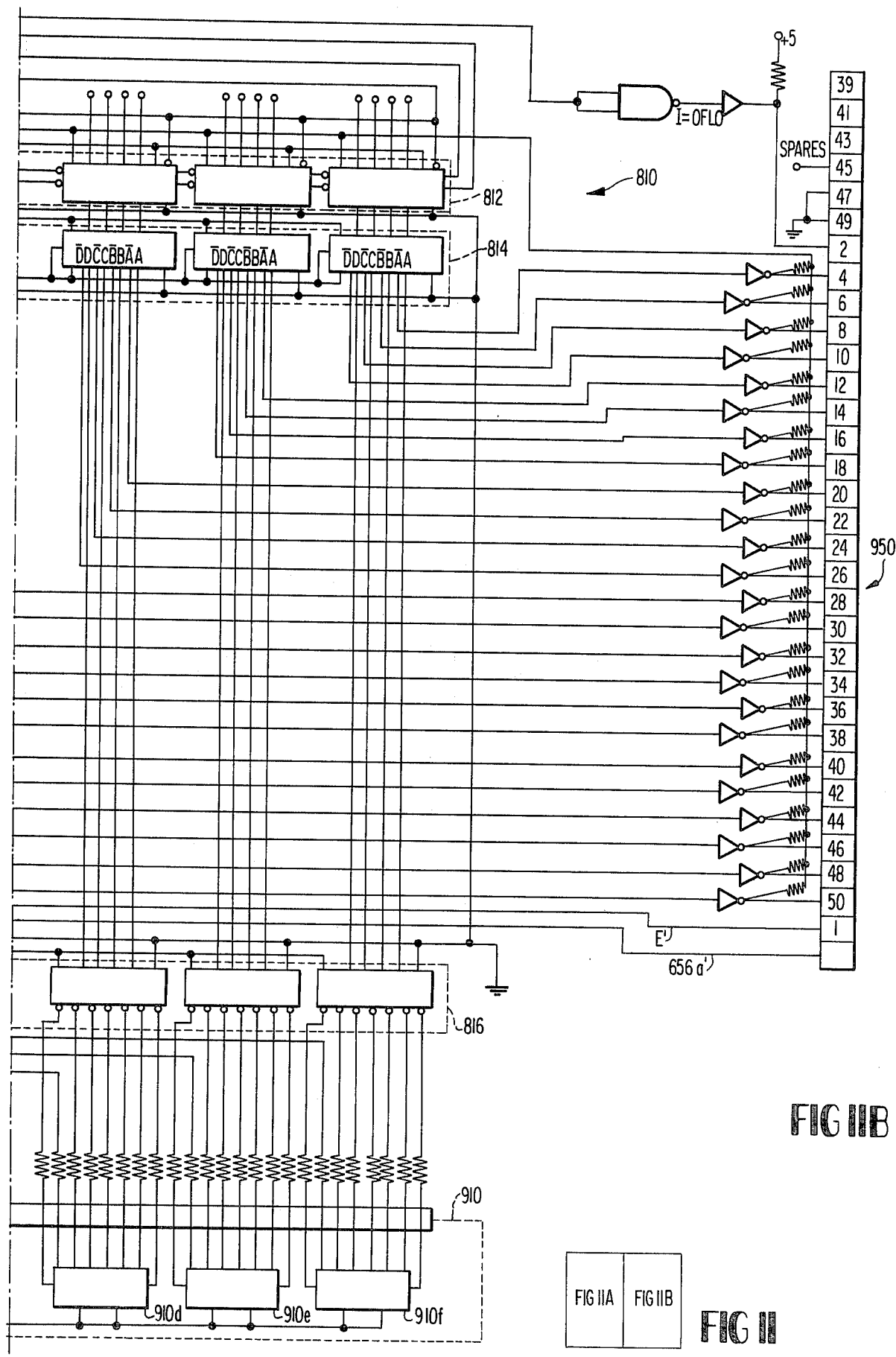
Figure 11A:
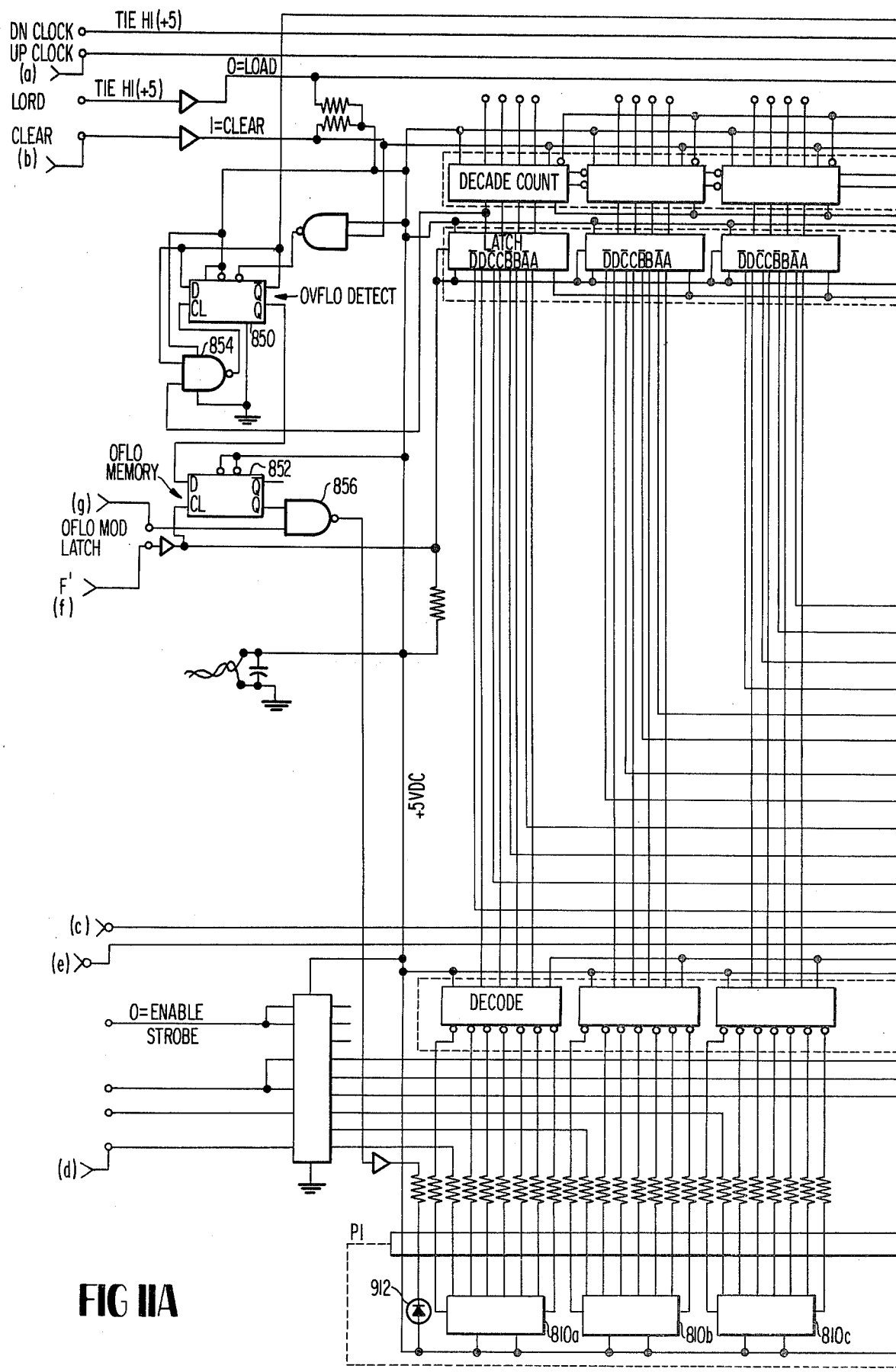

Gas is supplied to the upper bearing from an external source; the lower bearing is supplied from an internal manifold. An arrangement of ports or jets in each bearing cup provides the gas film for the suspension. The main structural element connecting the bearings is a structurally stiff hollow cylinder which has a mounting FIG. 2 is an exploded view of the gas-bearing measurement apparatus;

FIG. 3 is a cross-sectional view of the lower bearing assembly and preload springs;

FIG. 4 is a perspective view of the chopper holder and arm assembly;

FIG. 5 is a top view of the chopper holder and arm assembly;

FIG. 6 is a block diagram of the system electronics;

FIG. 7 is a circuit diagram of the signal conditioning logic;

FIG. 8 is a circuit diagram of the timer/interface logic;

FIG. 9 is a timing diagram of the signals occurring at various points of the timer/interface logic;

FIG. 10 is a timing diagram of the AUTO mode logic;

FIG. 11 is a circuit diagram of the counter/decoder and display logic;

FIG. 12 is a schematic top view of the measurement table and measurement axes; and FIG. 13 is a schematic side view of the measurement table and measurement axes.

DESCRIPTION OF THE PREFERRED EMBODIMENT

A. System Mechanics (FIGS. 1-5)

1. Gas Bearings and Measurement Table

The gas-bearing mass properties measurement system of this invention comprises a generally cylindrically shaped main housing 10 having a hollow interior and which may be secured by means of a flange 10a to a main floor-mounted frame (not shown). A pair of gas bearing assemblies 11, 13 are located at opposite ends of housing 10. For convenience, but not by way of limitation or specific orientation, bearing assembly 11 will be referred to below as the upper bearing assembly and bearing assembly 13 will be referred to as the lower bearing assembly. One of the advantageous features of this invention is that it is not limited to a particular gravitational environment; because it depends only on the torsional spring constant of an oscillating body, it is entirely suitable for use in extra-terrestrial environments, including such gravitationless environments as free space.

Each bearing assembly comprises a bearing 12 and an associated journal 14. Advantageously, upper bearing 12a and lower bearing 12b may be substantially identical, as may journals 14a and 14b.

Bearings 12a and 12b are located at opposite ends of main housing 10 and are fixed thereto in any known manner, e.g., by shrink fit or machine screws or the like. Each journal 14 has a part-spherical outer surface machined to mate with the inner surface of the corresponding bearing 12. A rigid hollow stabilizing shaft 16 extends through central axial openings 18 in bearings 12. Shaft 16 has one end portion 16a, of reduced diameter relative to the main, intermediate portion of the shaft, which extends into a central axial opening 20a in journal 14a such that shaft 16 is secured to journal 14a, by, e.g., shrink fit of shaft end 16a in journal opening 20a. At its other end, shaft 16 has a first reduced diameter portion 16b which terminates in an externally threaded end portion of further reduced diameter 16c. Shaft 16 extends through a central axial opening 18b in bearing 12b and central axial opening 20b in journal 14b. Shaft 16 is secured to journal 14b in a manner to be described in more detail below. Shaft 16 is hollow to accomodate a torsion rod 22 which extends through shaft 16 and terminates in externally threaded end portions 22a, 22b.

Each journal 14 has a generally planar surface 24 containing a radially extending channel 26 on either side of a centrally located recess 28 through which the center of axial journal opening 20 passes. Each face of radial channel 26 contains a threaded opening 30 for receiving mounting screws.

A generally circular measurement table support plate 32 contains a centrally located axial through hole 32a; two additional through holes 32b and 32c are spaced from central through hole 32a along a common radius of plate 32. The underside of support plate 32 contains a square key 34 and has a central opening or through hole which is aligned with through hole 32b. Support plate 32 mounts on journal 14a such that square key 34 sits in recess 28; when support plate 32 is so mounted on journal 14a, through holes 32a and 32c align with threaded holes 30. Support plate 32 is secured to journal 14a by mounting bolts 36 which pass through holes 32a (which may advantageously be threaded) and are received in threaded openings 30. The threaded end 32a of torsion rod 22 passes through the axially aligned openings in support plate key 34 and through hole 32b. One or both of these openings are advantageously threaded to receive the threaded end 22a of the torsion rod 22. A locking nut 38 threads over the torsion rod threaded end 22a to secure the torsion rod from radial and axial movement relative to the support plate 32. From this it will be seen that journal 14a, shaft 16, one end 22a of torsion rod 22, and support plate 32 are mechanically locked and function as a single unit.

It will also be seen that the center of the support plate 32 is offset from the rotational axis of the measurement apparatus a distance "a". A counterweight 40 is provided as a coarse balance adjustment. This counterweight is mounted on an arm 42 which is secured in any known manner (e.g. by mounting screws 44) to and extends radially outwardly from support plate 32.

A measurement table 46 provides a support for a test object which may be mounted securely to it. The measurement (or support) table 46 contains a generally circular recess on its underside in which support plate 32 is loosely received. A ring 48 is secure to the periphery of the bottom surface of measurement table 46, e.g. by mounting screws 50. Ring 46 forms an inwardly extending lip which secures support plate 32 within the recess on the underside of measurement table 46 to prevent relative axial movement between the support plate and the measurement table while permitting relative rotational movement. An index pin mounting member 52 is fixed to the underside of support plate 32, e.g. by mounting screws 54. An index pin 56 is received in an opening 52a in mounting member 52 and in a selected one of a plurality of through holes 58 formed in measurement table 46. This arrangement permits measurement table 46 to be rotated relative to support plate 32 and thereafter locked against relative rotational movement. When index pin 56 is seated in one of through holes 58, journal 14a, shaft 16, support plate 32 and measurement table 46 comprise a unitary mechanical system capable of rotating about the longitudinal axis of shaft 16.

As noted above, the reduced diameter end portion 16b and threaded end 16c of shaft 16 are slidably received in central axial opening 20b of journal 14b. A hollow tubular spacer 60 is slidably received over threaded end 16c within axial opening 20b. An internally threaded, square headed cap member 62 is threaded over shaft end 16c; the amount which cap member 62 may be threaded onto shaft end 16c is determined by the length of spacer member 60 which, at one end, abuts shaft portion 16b.

A generally flat, elongated journal preload spring 64 rests on the flat head of cap member 62. The flat square head 62a of cap 62 has four threaded screw holes extending therethrough, one substantially at each corner. A generally square spring retainer 66 has four matching threaded holes. When assembled by means of appropriate screws, cap member 62 and spring retainer 66 securely sandwich between them preload spring 64. As can be seen in the drawings (FIGS. 2, 3), the ends of preload spring 64 are reverse bent to form facing U-shaped feet 64a, 64b. Preload spring 64 seats in radial channel 26 of journal 14b; preload spring legs 64a and 64b are secured to the journal 14b by screws received in threaded openings 30. Preload spring 64 exerts an axial preload force on shaft 16, the magnitude of which is determined by the length of spacer 60.

The purpose of preload spring 64 is to preload the two spherical journals against each other with a predetermined spring force. It is noted that journal 14b is not fixed to shaft 16 in the same manner as journal 14a; rather, journal 14b is resiliently secured to shaft 16 through preload spring 64. Advantageously, the center line or plane of spring 64 passes through the center of radius of journal 14b and shaft 16 is secured to spring 64 substantially at a location conincident with the center of radius of journal 14b. For this reason, journals 14 are not quite hemispherical. This construction prevents the shaft 16 from pivoting away from the axis of rotation due to the weight of the test object, which may be located on measurement table 46 with its center of gravity offset from the rotational axis of the system; this essentially limits the bearing arrangement to a single degree of freedome, i.e. in the axial direction, with a magnitude which is a function of the force exerted by spring 84.

Torsion rod 22 is tensioned by a torsion rod preload spring 68. Spring 68 may be generally T-shaped, the arms of which define an arc having the same radius of curvature as the main housing 10. The arms of the T-spring 68 are secured, e.g. by screws 70 to a lower gland sleeve 72b which provides a seal around bearing 12b (an upper gland sleeve 72a provides a corresponding seal around bearing 12a). The leg of T-spring 68 extends radially inwardly and has an opening therein through which threaded end 22b of torsion rod 22 passes. End 22b is secured by lock nuts 74 to T-spring 68. The preload force exerted by spring 68 acts in conjunction with the force exerted by spring 64 to increase the preloading of the journal 14a in bearing 12a. Advantageously, spring 64 provides from about 5-30 pounds of force (preferably about 15 pounds) and spring 68 provides about 5 pounds of force, resulting in a preloading force of 10-35 pounds (preferably about 20 pounds) on journal 14a in bearing 12a.

As noted above, the upper bearing assembly 11 and the lower bearing assembly 13 are gas operated. Each bearing 12 has a plurality of gas ports or jets 76 open to a common gas manifold 78 within the bearing and formed by the outer bearing surface and gland sleeve 72. The flow of gas through each port or jet 76 is controlled by jet screws 80. Preferably, there are from about 6 to 16 gas ports arranged in a common plane about the inner surface 82 of the bearing 12. A relatively rigid hollow cylindrical tube 84 comprises a connecting conduit between the manifolds 78 of bearings 12a and 12b. The manifold 84 is connected to the bearings 12 by air fittings 85 which may comprise an air coupling fastener 85a, O-rings 85b and an air coupling 85c (one such air fitting 85 being shown). Gas is supplied to manifold 78 of the upper bearing 12a from an external source (not shown); the lower bearing 12b is supplied from bearing 12a through internal manifold 84. Any dry, clean gas or gas mixture can be used; advantageously, one SCFM of gas (such as nitrogen or air) at 40 psig filtered through a one micron filter and having a free air dew point of about −10° F. maximum can be used with this invention. The gas exiting from gas ports 76 provide a nearly frictionless film between the bearings 12 and journals 14. For convenience, but not by way of limitation, the gas or gas mixture will be referred to generally as "air".

The apparatus thus far described comprises a mechanism which permits the measurement table 46 to oscillate relatively freely about a highly accurate pivot axis as a function of the spring constant of torsion rod 22. This oscillatory motion is detected by an electromechanical transducer, such as a photodetector assembly in which the light beam between a light source and a photoreceptor is interrupted or chopped periodically as a function of measurement table oscillation.

The chopper or interrupter assembly (FIGS. 4, 5) comprise a chopper holder 86 which fits around and is securely fixed to the main intermediate part of shaft 16 for movement therewith. The chopper holder 86 includes a flanged bottom 88 having, on its upper surface, a pair of radially aligned and oppositely extending V-shaped grooves 89a, 89b, the purpose of which will be described in more detail below. The chopper holder 86 has an intermediate section 90 of enlarged diameter relative to the diameter of the main portion of the chopper holder. This enlarged diameter portion 90 contains a circumferential groove 92 which receives a chopper arm 94 such that the chopper arm extends in a substantially radial direction from the rotational axis of the apparatus. The chopper arm is secured in the groove 92 by a screw 96a received in a threaded hole 96b extending axially through the enlarged diameter portion 90.

Diametrically opposite the enlarged diameter portion 90 which receives chopper arm 94 are a pair of outstanding lugs 98a, 98b. A pair of oppositely directed adjustable set screws 100a, 100b are located in lugs 98 in facing relation; the purpose of set screws 100 will be made clear below. Adjacent lugs 98, the sides of enlarged diameter portion 90 are angled, one of which is shown at 102a. A fine adjustment counterweight screw 104a is received in an opening in angled face 102a so as to be aligned at an angle of about 45° from the longitudinal axis of chopper arm 94 when it is mounted in groove 92. A second fine adjustment counterweight 104b is received in a threaded opening in complementary side face 102b adjacent lug 98b; fine adjustment counterweight 104b is also located at a complementary angle of about 45° relative to the longitudinal axis of chopper arm 94. Counterweights 104 are adjustable to permit the measurement apparatus to be rotationally balanced under no load conditions. When properly adjusted, the measurement system will have no net torque in the measurement shaft because the center of gravity will be through the center of the shaft. In use, it is important to balance the measurement assembly for noise rejection, particularly in the case where a small mass is to be measured.

A spring stop 106 is mounted to main housing 10, e.g., by screws 108; the spring stop extends inwardly and is received in the space between lugs 98 of chopper holder 86. Spring stop 106 is a stiff spring which provides a positive but not a harsh stop to limit the rotational travel of chopper holder 86 and, thereby, the rotational travel of the entire measurement system, including shaft 16 and measurement table 46. Spring stop 106 has sufficient compliance to prevent a shock from occurring in the system if it is accidentally banged against the stop. Set screws 100 are adjustable to define the amount of permitted rotational travel of the measurement system, and are preferably adjusted to permit a maximum arcuate movement of slightly more than plus and minus three degrees from the rest position of the chopper arm axis. Thus, a total maximum swing of slightly more than six degrees peak-to-peak is preferably permitted during a measurement period.

In accordance with the construction described above, the measurement table 46 is rigidly supported by the oppositely disposed gas bearing assemblies. The bearings form an axis (defined by the longitudinal axis of shaft 16) with a single degree of freedom, which is rotation, and the plane of the measurement table is substantially perpendicular to this axis. A torsional pendulum is created by the torsion rod 22 extending through the hollow stabilizing shaft 16; the torsion rod is attached at one end to the measurement table and at the other end to the machine frame through housing 10. Displacing the measurement table through a small angle (e.g. slightly greater than 3°) and releasing it will result in oscillations about a rest position with a period that is governed by the spring constant of torsion rod 22 and the mass moment of inertia of the rotating parts (including the load being measured as the only unknown quantity).

It is a feature of the preferred embodiment of this invention that only periods having oscillation amplitudes of 3° or less are used in making period averaging measurements. This is intended to avoid inconsistencies or discrepancies introduced into the measuring system during the initial oscillation periods; it will be recalled that oscillation is begun by rotating the measurement table a distance sufficient to provide the necessary mechanical energy for maintaining oscillatory motion over a large number of periods. Specifically, measurement table 46 is rotated until one of set screws 100 engages spring stop 106. Although, in the preferred embodiment, this is done manually, it could also be accomplished mechanically by appropriate drive means. Table 46 thereafter oscillates freely, the oscillation period continually decaying until it reaches 6° peak-to-peak. At this maximum measurement period, the measurement cycle begins; the period of each successive oscillation is then measured for a predetermined number of oscillations (defined as the measurement cycle). The average oscillation period is determined for the measurement cycle and this value is displayed; at the same time, this average value may be supplied to a computer to be used in determining mass properties, such as center of gravity and moment of inertia, of the test object.

2. Caging Device

It will be seen that the apparatus only operates effectively when gas is supplied to the bearing assemblies. It is also apparent that if rotation of the measurement table is attempted when the air supply is turned off, the machined surfaces of bearings 12 and journals 14 will rub against each other. This could result in damage to the bearings and thus adversely effect the operation of the measurement system. In order to prevent the measurement table and journals from being rotated in the absence of an adequate supply of air pressure, a failsafe caging mechanism is provided. The caging mechanism engages the shaft under controlled conditions if air pressure falls below acceptable values, thereby protecting the bearing surfaces from damage and providing an orderly shut-down of the measurement apparatus.

The caging mechanism consists essentially of an air cylinder constructed to have a longitudinal bore through the center in which shaft 16 is slidably received. The caging mechanism comprises a main cage housing 110. A cage sleeve 12 is fixed to the inside of cage housing 110 by at least a pair of pins or screws 114, 114 which pass through matched openings in the housing 110 and the sleeve 112 (which openings may be threaded); the ends of pins or screws 114 extend radially into the central opening in the caging device to mate with the V-shaped grooves 89 in the flanged bottom 88 of chopper holder 86. A top-hat shaped piston 116 is axially movable in cage housing 110; piston 116 has an axial bore through which shaft 16 passes. O-rings 118 are provided between the interior surface of cage housing 110 and exterior surface of cage sleeve 112 and between the interior surface of cage sleeve 112 and exterior surface of piston 116 to provide air-tight seals for the piston/cylinder arrangement. A sealing ring 120 is fixed to the lower end of cage housing 110 and has a central opening through which shaft 16 passes. Sealing ring 120 provides a mounting support for a caging spring 122. Spring 122 exerts an upward force against the inside top surface of piston 116 to normally urge the piston away from sealing ring 120 and toward and into engagement with the flanged bottom 88 of chopper holder 86; preferably spring 122 exerts a force of about 30 pounds.

Pressurized air is supplied to the caging device through a first air fitting 124 mounted to the cage housing 110; a flexible conduit 126, such as a thin-walled plastic tube, is connected at one end to fitting 124 and at its other end to a second air fitting 128 connected to the main manifold 84. Thus, the same pressurized air supplied to the bearings is also supplied to the caging device.

The caging device is mounted in the main housing 10 in such a manner as to permit relative axial movement of the caging device. A pair of bearing blocks 130a, 130b are securely fixed to axially opposed extensions 110a, 110b of cage housing 110. A pair of cylindrical bearings 132a, 132b are received in through holes in respective bearing blocks 130a, 130b. An axially extending shaft 134 is securely fixed to a center bearing block 136 which in turn is securely fixed to main housing 10, e.g. by screws (not shown). Bearing blocks 130 are slidably mounted, through bearings 132, on shaft 134. A coil support spring 138 is slidably mounted over shaft 134 between bearing blocks 130a and 136. Spring 138 normally acts to push bearing block 130a away from bearing block 136 and thereby urges cage housing 110 upward; preferably spring 138 exerts a force of about 0.5 pounds.

The caging device operates in the following way to prevent inadvertent rotational movement of the measurement table and bearing assemblies when air pressure to the apparatus has been shut off. Caging spring 122 acts against sealing ring 120 to urge piston 116 upward against the flanged bottom 88 of chopper holder 86. The chopper holder, which is fixed to shaft 16, is substantially restrained against vertical movement. Thus, when the piston 116 engages the bottom of the chopper holder 86, spring 122 exerts a force against sealing ring 120 to urge the cage housing 110 (and sleeve 112) downwardly against the upwardly acting force of support spring 138. The cage housing and sleeve move downwardly until pins or lugs 114 engage the V-shaped grooves 89; the force acting between the sleeve 112 and chopper holder 86 comprises the force of spring 122 minus the force of the spring 138. Advantageously, the system is designed so that approximately 25 pounds of net force are applied between sleeve pins 114 and chopper holder 86.

When the air supply to the system is turned on, piston 116 is urged downwardly by the air pressure against the force of spring 122 to the limit of its travel, bottoming out against sealing ring 120. At the same time, the air pressure acts against the sleeve 112 to urge the sleeve and cage housing 110 upwardly, aided by the force of support spring 138 to thereby disengage sleeve pins 114 from the chopper holder grooves. Thus, the chopper holder, shaft and measurement table are now free to rotate within the limits permitted by the spring stop 106 and adjustment set screws 100.

The spacing between the upper and lower bearing assemblies is maintained by one or more tie-rods 140 fixed to the bottom surfaces of bearings 12; advantageously three such tie-rods equi-angularly spaced around the circumference of the bearings 12 are provided. Tie-rods 140 are adjustable by means of tie-rod adjustment links 140a and tie-rod adjustment nuts 140b.

3. Photo Pickup

In the preferred embodiment, oscillations of the measurement table are detected by a photo pickup arrangement comprising a photo pickup head 144 fixed to a mounting bracket 146; the mounting bracket in turn is fixed to the main housing 10. A pair of light transmitters, such as light-emitting diodes, mounted on a board 148, are fixed to the pickup head 144 as are a pair of light receivers, such as photo-transistors, mounted on a board 150. A space is provided in the pickup body 144 between the LED board 148 and phototransistor board 150 through which chopper arm 94 passes. A photo pickup cover 152 covers the photo pickup head 144 to substantially inhibit extraneous or ambient light from acting on the photo pickup device. The LED light source is excited with D.C. to reduce line dependent noise in the photosensor.

Upper and lower housing covers 154a, 154b fit around the main housing 10 to cover various access openings provided in the housing for assembly purposes.

B. System Electronics (FIGS. 6–11)

Essentially all electronics and controls for the mass properties measurement system of this invention are contained within an electronics console, with the exception of the photo pickup head 144 and signal conditioning circuitry. The electronics package is organized primarily into two modules 502, 504, each of which is equipped with separate 5 VDC power supplies 506, 508. Signal conditioning module 502 is advantageously located close to the measurement unit. It contains signal conditioning logic 510 which transmits period data and strobe data via line drivers and terminated differential transmission lines, to the console module 504. Module 504 comprises timer/interface logic 610, counter/decoder logic 810 and display logic 910. An interconnection cable 507 connects the machine electronics and console electronics. Power is supplied through a power cable 511, which may be a six-foot, three-conductor line cord, CORCOM part number 80-1245, which includes a filter.

1. Signal Conditioning Logic (FIG. 7)

The photo pickup head 144 comprises a pair of light transmitters 512, 514, which may advantageously consist of light-emitting diodes, each associated with a phototransistor or other photo-electric transducer, 516, 518. By way of example, but not limitation, HP 5082-4658 devices may be used for LEDs 512, 514 and FPT 10013 devices for phototransistors 516, 518.

Photo-detector pair 512, 516, which measures the period of oscillation of the measurement system, is mounted coincident with the axis of the photo pickup head 144 parallel to the axis of shaft 36. When the measurement system is at rest, i.e., not oscillating, the edge of chopper arm 94 is so aligned with the light path between LED 512 and transistor 516 that the output of photo-transistor 516 changes state upon the initiation of angular motion of chopper arm 94 in either direction. The highest angular velocity of chopper arm 94 occurs when the arm passes through the center of oscillation, which is coincident with the axis of pickup head 64. This coincides with the point of maximum kinetic energy of the system and the point at which the chopper blade is moving the fastest to thereby produce the hightest dv/dt (change in voltage) in the period measurement photo-detector pair 512, 516.

Photo-detector pair 514, 518 is angularly displaced, 3° in the preferred embodiment, from the period measurement photo-detector pair 512, 516 and produces a strobe signal when the chopper arm swings through an arc of more than 3° from the center of oscillation. A strobe signal is produced during each period that the period amplitude is greater than 6° peak to peak. As the system oscillates, the period amplitude decays; when the period amplitude decays to 6° or less, strobe signals are no longer produced and, as will be described in more detail below, the measurement period begins.

As shown in FIG. 7, the outputs of phototransistors 516 and 518 are connected to respective inputs of comparators 520 and 522. The second outputs of comparators 520 and 522 are each connected to a precision reference voltage established by reference diode 524. The outputs of comparators 520 and 522 are connected through respective twisted wire pairs and interconnection cable 507 to the inputs of differential line receivers 621 and 614, respectively, of the timer/interface logic circuit 610 (FIG. 8). The inverted output of differential line receiver 612 provides the period signal X and the inverted output of differential line receiver 614 provides the strobe signal Y.

2. System Timing and Mode Selection

System timing is derived from a 20 MHz source 616 through a divide-by-two divider 617; the output of divider 617 is divided down by a first decade counter 618 to provide a 1.0 MHz fast clock signal, which in turn is divided by a second decade counter 620 to provide a 0.1 MHz slow clock signal. A manually operated switch 622 located on the front panel 626 of the console permits the operator to select the fast clock (X.X), the slow clock (.XX) or an auto ranging mode (AUTO). In the AUTO mode a decision making circuit, comprising a portion of the timing/interface logic, automatically selects the clock frequency to be used based on the duration of the mechanical oscillation period. Selection is based on a one second test period derived from the 20 MHz clock; for longer periods of oscillation, the slow clock is used and for short oscillation periods (less than 1 second), the fast clock is used.

A thumb-wheel switch 624 mounted on the front panel 626 permits the operator to select the number of periods to be averaged in a particular measurement cycle; for example, the operator may select from 1 to 9 periods for a desired measurement. For a given selection, the period counts are accumulated until the number of periods counted matches the selected number. The average value (in seconds) of the selected periods is displayed at the conclusion of the measurement cycle on display 910, which advantageously comprises six 7-segment LED, incandescent, or LCD display devices (or any other suitable digital display device) 910a through 910f and an overflow indicator 912.

Also located on front panel 626 is a one-digit indicator 628, which may comprise a 7-segment LED or LCD device similar to display devices 910; one-digit indicator 628 displays the current period being measured during a measurement cycle. Also located on the front panel 626 are a master ON-OFF switch 630, a reset switch 632, a double pole push-on - push-off switch 634 for energizing the air supply to the bearings and caging device, and a pair of "ON AIR" and "CAGED" indicator lights 636, 638 for indicating the status of the mechanical system.

In the following description, the terms "positive", "high", and "1" are used interchangeably; also the terms "negative", "low", and "0" are used interchangeably, when referring to logic signals.

FIG. 9 is a timing diagram of signals occurring at various points of the timer/interface logic 610. For convenience, period signal X is shown as a regular periodic square wave, although the actual signal is a function of the amplitude of the mechanical period. When chopper arm 94 is at one end of its oscillatory swing, the light path between LED 512 and phototransistor 516 is unbroken and period signal X is in its high or logic "1" state. When the leading edge of chopper blade 70 crosses the axis of photo pickup head 144, it interrupts the light path between LED 512 and phototransistor 516, causing transistor 516 to change state and period signal X to go low (logic "0"). The light path between LED 512 and photo-transistor 516 remains interrupted (and period signal X remains low) until the trailing edge of chopper arm 94 crosses the axis of pickup head 144. Chopper arm 94 thus no longer blocks the light path between LED 512; phototransistor 516 again changes state; and period signal X goes high again and remains high until the chopper arm again interrupts the light path on its return travel. As the oscillation amplitude decays, the length of time the light path is chopped decreases. Consequently, the length of time period signal X is in its low state decreases; the length of time period signal X is in its high state also decreases (the duty cycle remains essentially 50%). This change in the period of signal X is taken into account by the system when measuring the average value of the selected number of measuring periods; however, for the purpose of describing the operation of the timing circuit, the period decay as it affects period signal X may be conveniently ignored.

As noted above, the measuring cycle begins only when the amplitude of oscillation decays to 6° (i.e. 3° on either side of the photo-pickup axis). The period amplitude is measured by photo-detector pair 514, 518 which generates a strobe signal at Y for each period having an oscillation amplitude greater than 6° peak-to-peak (3° on either side of the photo-pickup axis).

3. Timer/Interface Logic (FIG. 8)

Period signal X triggers a monostable multivibrator or oneshot 640 to generate a negative going pulse X' each time X goes low. Pulse X' and strobe Y are connected to a latch circuit comprising cross-coupled NAND gates 642a and 642b. The output A of latch 642 and period signal X are connected to respective inputs of a NAND gate 644. Latch output A goes high each time latch 642 is pulsed by X' and goes low each time latch 642 is pulsed by Y. As can be seen from the timing diagram of FIG. 9, the period immediately following the last oscillation period having an amplitude greater than 6° causes output A to go high and remain high (i.e., strobe Y is no longer generated) until the measurement table is next caused to oscillate with periods of greater than 6° peak-to-peak.

The timing of latch output A and period signal X is such that the output A' of NAND gate 644 remains high as long as the measurement system oscillates with periods of greater than 6° peak-to-peak amplitudes. When the oscillation of the measurement system decays to less than 6° peak-to-peak, latch output A goes high and remains high. Output A' of NAND gate 644 thereafter follows period signal X.

NAND output A' and strobe signal Y are connected to respective inputs of a second latch circuit 646 comprising cross-coupled gates 646a and 646b. Like latch 642, latch 646 is reset by the first strobe signal Y to cause latch output B to go high. Latch 646 is next triggered to cause output B to go low the first time that signal A' goes low when it begins to follow period signal X. Latch 646 output B then remains low until reset by strobe signal Y.

Latch 646 output B is connected through an OR gate 648 to one input of a third latch 650 also comprising cross-coupled NAND gates 650a and 650b and having outputs B' and C'. The second input of OR gate 648 is connected to the output of an OR gate 652 having one input connected to the X' output of oneshot 640 and a second input connected through an inverter to a reset line 632a which is normally biased high by resistor R1 connected to +5 VDC. The output of OR gafe 648 is held high as long as latch 646 output B remains high; when output B goes low, the output of OR gate 648 follows X' (the output of oneshot 640). Latch 650 may be reset manually by reset button 632 (closing switch 632 pulls reset line 632a low); alternatively, latch 650 may be reset by the first strobe signal Y through OR gate 654, the output of which normally follows the input connected to strobe signal Y. With latch 650 reset, output B' is high and output C' is low. Latch 650 is thereafter triggered by the first X' signal occurring after latch 646 is triggered to drive output B low. Triggering latch 650 drives output B' low and output C' high. Latch output B' is connected to respective inputs of a master clock memory latch 656 and a period counter 658. The period averaging measurement cycle is initiated when B' goes low, as can be seen from the timing diagram of FIG. 9.

Period signal X is supplied to one input of an OR gate 659; the output D' of gate 659 is connected to the counting input of period counter 658 and normally follows X. Counter 658 is enabled to count periods only when B' goes low (at the start of a measurement cycle).

Latch output B' is also connected to one input of an OR gate 660, the other input of which is connected to the output of a set of coincidence gates 662, which may consist of wired EXCLUSIVE-NOR gates. The coincidence gates 662 compare the BCD output of thumbwheel switch 624 with the BCD output of period counter 658 which counts the number of measured periods. Coincidence gate output D is connected to the second input of OR gate 659 to inhibit counter 658 from counting additional oscillation periods after the number of periods counted coincides with the number of periods selected on thumbwheel switch 624. Specifically, when gates 662 detect coincidence between the outputs of thumbwheel switch 624 and period counter 658, coincidence output D goes high, thereby pulling and holding gate 659 output D' high.

The outputs of period counter 658 are also connected through a decoder-driver 661 to the single digit display 628 which displays the running count of the oscillation periods averaged during the measurement cycle.

OR gate 660 has an output E which provides a data ready level or time window during which period data may be transmitted through an interface connector 950 to an external computer (not shown). OR gate 660 output E is also connected to one input of an AND gate 664, the other input of which is connected to period signal X. The output F of AND gate 664 is connected to the negative trigger input of a (approximately 0.5 $\mu$sec) oneshot 666. The triggering of oneshot 666 is controlled by the output G of a latch 668 comprising cross-coupled NAND gates 668a and 668b. Latch output G is normally high and is triggered low by a negative going signal appearing at the output of a NAND gate 670 having inputs connected to coincidence output D and oneshot 666 output F'. When latch 668 is triggered to drive output G low, oneshot 666 is thereafter inhibited from being triggered further by gate 664 output F.

The output F' of oneshot 666 is connected to the negative trigger input of a (approximate 0.20 $\mu$sec.) oneshot 672 which generates an output signal H following the negative going transition (from high to low) of F'. Oneshot 672 output H controls the frequency of the master clock in the AUTO mode, as will be described in more detail below.

F' is connected to the counter decoder logic (as will be described in more detail below) and provides the update signal for the display. In essence, F' updates the display each period until the start of a measurement cycle; at that time F' latches and holds the last period display until the end of the measurement cycle, at which time it triggers one more time to display the average value (in seconds) of the measured oscillation periods. F' is thereafter inhibited to hold the display of the measured periods until latch 668 is reset manually from the console by reset button 632.

4. Period Measurement

Period measurement is accomplished by counting the number of clock pulses occurring during each oscillation period of the measurement table mechanical assembly. Period averaging is accomplished by dividing the master clock frequency by the total number of selected periods to be averaged and then counting the total number of divided clock pulses occurring during the selected number of periods. Thus, for example, if the number of periods to be averaged is selected to be five, the system of this invention will divide the master clock frequency (e.g. 1.0 MHz) by 5 and count the number of 200 KHz pulses occurring during the 5 selected consecutive oscillation periods. This dividing and counting operation is performed by the following portion of the timer/interface logic (FIG. 8).

The master clock signal appears at output MC of an OR gate 674 which is connected to one input of an AND gate 676. The other input of gate 676 is connected to latch 650 output B'. The output of gate 676 is connected to one input of an OR gate 678, having its other input connected to the output of an AND gate 680. One input of gate 680 is connected to latch 650 output C' and the other input is connected to the output of a (approximately 0.50 $\mu$sec.) oneshot 682.

The positive trigger input of oneshot 682 is connected to the output of wired EXCLUSIVE-NOR coincidence gates 684. One set of inputs to coincidence gates 684 is connected to the BCD outputs of thumbwheel switch 624; the second set of inputs of coincidence gates 684 is connected to the BCD outputs of a counter 686. The input of counter 686 is connected to the MC output of OR gate 674.

Prior to the start of a measurement cycle, latch 650 output B' is high and output C' is low. The output of AND gate 680 is therefore inhibited and the output of AND gate 676 follows the master clock MC; thus the output of OR gate 678 follows the master clock MC directly through gate 676. F' is triggered at the start of each oscillation to latch and display the count from the previous oscillation.

At the start of a measurement cycle, latch 650 is triggered to drive output B' low and output C' high. This inhibits gate 676 and enables gate 680, the output of which thereafter follows the output of oneshot 682. Counter 686 counts the master clock pulses MC; when the counted clock pulses equal the number selected on thumbwheel switch 624, the output of coincidence gates 684 goes high. This triggers oneshot 682 which resets counter 686 and provides a conditioned clock signal at the output of OR gate 678 through gate 680. It will therefore be seen that the conditioned clock output of OR gate 678 during a measurement cycle is 1/nth the master clock frequency, where "n" is the number of periods to be averaged selected on thumbwheel 624. The conditioned clock signal is supplied to the counter-decoder logic 810, in a manner to be described below.

5. Auto-ranging Mode Logic

The timer/interface logic also includes a decision-making circuit which automatically selects the clock frequency to be used based on the duration of the mechanical oscillation period. Selection is based on a one second test period derived from the 1.0 MHz fast clock; for longer periods of oscillation, the slow clock is used and for short oscillation periods (less than 1 second), the fast clock is used.

The auto-ranging decision-making circuit comprises a (approximately 2 millisec.) oneshot 688 having its negative trigger input connected to the N output of an OR gate 690. The inputs of OR gate 690 are connected respectively to the outputs of NAND gates 692a and 692b; the inputs of NAND gates 692 are connected to the BCD 1 and 8 outputs of a six decade counter divider chain 694 which divides the fast or 1 MHz clock signal output of counter 618 by $10^6$. The output of counter 618 also drives decade counter 620 which produces at its output the slow or 0.1 MHz clock signal.

Gates 690 and 692 generate a negative going pulse at output N each time the counter circuit 694 counts for one full second. The negative going pulse at N triggers oneshot 688 to produce a negative going pulse at output K. Output K is connected to the positive trigger input of a (approximately 1 μsec.) oneshot 700 having one output S connected to the input of an OR gate 702 and a complementary output S' connected to the negative trigger input of a oneshot 704. Oneshot 688 output K is connected through an inverter 706 (to become K') to a second input of OR gate 702. The output M of OR gate 702 and the output L of oneshot 704 are connected to respective inputs of OR gate 708, the output of which is inverted (to become P') and connected to one input of an OR gate 710; the other input of OR gate 710 is connected to the AUTO terminal of selector switch 622. The output R of OR gate 710 is connected to one input of an AND gate 712 having, as its other input, the X.X terminal of selector switch 622. The output T of AND gate 712 is connected to the trigger input of memory latch 656. Finally, oneshot 672 output H is connected to the reset inputs of counters 694.

The Q output of memory latch 656 follows the input T from gate 712 as long as the strobe input B' to memory latch 656 is high. When strobe B' goes low, the memory latch outputs remain latched in the states that obtained at the time B' went low. The Q output of latch 656 is ANDed in gate 714a with the fast clock output from counter 618; the Q output of latch 656 is ANDed in gate 714b with the slow clock output from counter 620. The outputs of AND gates 714 are ORed in gate 674 to provide the master clock signal MC.

The purpose of latching the clock signal during a measurement cycle is to prevent the system from switching between fast and slow clocks during the measurement cycle; such switching would make it effectively impossible to obtain accurate measurements.

FIG. 10 is a timing diagram showing the operation of the auto-ranging or decimal point shift circuit when the oscillation period is greater than one second and then decays to less than one second. Counter reset signal H is generated at the start of each oscillation period (delayed by the approximately 0.5 micro-second delay of oneshot 666). If the oscillation period is greater than one second (e.g., 1.5 seconds as shown in FIG. 10), a strobe signal N will occur when the counter 694 has counted 999,999 pulses after being reset by H. Negative going strobe N triggers oneshot 688. The output K of oneshot 688 goes low, forcing the (Reset) output L of timer oneshot 704 low. Output K remains low for approximately 2 milliseconds and then returns high; the positive going trailing edge of K triggers oneshot 700 to generate a (approximately 1 μsec.) positive going pulse at output S and a complementary negative going pulse at output S'. The latter triggers timer oneshot 704 to switch output L high until the next negative going pulse on oneshot 688 output K appears or for a period of about 2.1 seconds if no more pulses appear.

It will be seen from the timing diagram of FIG. 10 that when K goes low, the output M of gate 702 goes high and remains high until the output S of oneshot 700 returns low. When M first goes high, L is still low; the output of gate 708 follows M, the output R of gate 710 follows the inverted output P' of gate 708 (provided switch 622 is in the AUTO mode), and the output T of gate 712 follows R. Thus, when M goes high, T goes low, the Q output of memory latch 656 goes low, and the Q output thereof goes high. Gate 714a is disabled and gate 714b is enabled by this action to inhibit the fast clock and pass the slow clock through gate 674. Thereafter, as long as the oscillation period is greater than one second, the high states of M and L overlap to maintain latch 656 in the state to pass the slow clock signal and inhibit the fast clock signal.

When the oscillation period decays to less than one second (e.g., 0.8 sec. in FIG. 10), no strobe signal N is generated since counters 694 are reset by H before they can generate the 999,999th pulse. As soon as oneshot 688 stops triggering for more than the time constant of timer oneshot 704 (e.g., 2.1 seconds), the output L of oneshot 704 returns low and since M is also low, the output of gate 708 goes low, the output R of gate 710 goes high, the output T of gate 712 goes high and the Q output of latch 656 follows T, thus going high. This results in gate 714a becoming enabled and gate 714b becoming disabled, thereby inhibiting the slow clock and passing the fast clock through gate 674.

The auto-ranging circuit may be disabled and the slow clock manually selected by engaging the wiper of selector switch 622, which is tied to ground, with terminal X.X. This pulls one input of AND gate 712 low, thereby pulling output T low and outputs Q and Q of latch 656 low and high, respectively. Alternatively, placing the selector switch 622 in the .XX position, ties the same input of gate 712 high; the other input of gate 712 is tied high through one input of gate 710 which is also tied high through resistor R2 connected to 5 VDC. Under these circumstances, the output T of gate 712 is high and outputs Q and Q of latch 656 are high and low, respectively. Gate 714a is thus enabled and gate 714b is disabled to pass the fast clock signal and inhibit the slow clock signal.

6. Counter-display Logic (FIG. 11)

This logic comprises a six-stage decade counter 812 having a serial input connected to the conditioned clock output of timer interface logic gate 678 (FIG. 8). The counter outputs are connected to corresponding latch circuits 814 having one set of outputs connected to corresponding decoder drivers 816 and a set of complementary outputs connected to the interface connector 950 for transmission to the external computer. The outputs of the six decoder driver stages 816 are connected to the six digital display devices 910 through, for example, a common terminal block 914.

Oneshot 666 output F' (FIG. 8) is connected to the clock inputs of latch circuits 814. Oneshot 672 output H is connected to the "clear" inputs of counters 812. Each time output F' goes high latch circuits 814 are triggered to store the current output of counters 812 and display this count on display devices 910. When F' goes low, latch circuits 814 hold this count until triggered again by the positive-going F'. As seen from FIG. 9, the trailing edge (negative-going side) of F' triggers oneshot 672 to generate pulse H which, among other things, clears counters 812 to zero for counting the duration of the next oscillation period. The display, however, remains locked by latch circuits 814 to display the last count until updated by the next positive going F' pulse 7. Overflow Indicator Logic An overflow detector/indicator logic circuit is provided which comprises a pair of series-connected D flip-flops 850, operating as a one-bit counter, and 852, operating as a one-bit shift register. If the count in decade counter 812 exceeds 999999, the most significant digit (i.e., "1") is detected by a gate 854 which pulses the clock input of D flip-flop 850, causing the Q output thereof to change state from "0" to "1". This sets the data input of D flip-flop 852 high to cause the Q output thereof to change state from "0" to "1" only if the output of flip-flop 852 had previously been low. This change occurs upon the occurrence of the next succeeding F' pulse.

If the overflow condition is removed during the next oscillation period (i.e., the count does not go higher than 999999) overflow detector flip-flop 850 will be reset by output H of oneshot 672 and this change will be stored in overflow memory flip-flop 852 upon occurrence of the next succeeding F' signal.

The Q output of D flip-flop 852 is coupled to one input of NAND gate 856; the second input of gate 856 is coupled to the output of an overflow wink timer 858 (see FIG. 8). Timer 858 may comprise an astable multivibrator operating at a frequency of, e.g., approximately 4 Hz. When the Q output of overflow memory flip-flop 852 is high, the output of gate 856 follows the output of timer 858 to cause LED 912 to wink at the oscillation frequency of timer 858.

8. Air Supply Control

The double pole switch 634 controls the air supply to the bearing assemblies 11, 13 and to the caging device. Closing switch 634 (assuming master ON-OFF switch 630 is closed) completes a circuit across the line voltage supply 511 through an air solenoid valve 50. When energized, valve 550 opens to permit pressurized gas to be supplied to the bearings and caging assembly. A pressure sensitive switch 552 operates, when switch 634 is closed, to energize the "CAGED" light 638 when the gas supply pressure is insufficient to disengage the shaft from the caging mechanism and energizes the "ON AIR" light 636 when the gas pressure is sufficiently high to unlock the shaft 16 from the caging mechanism.

C. System Operation (FIGS. 12, 13)

The measurement system of this invention exhibits a period called base or tare period. By placing an unknown object on the measurement table 46 and measuring a new period, the MOI (moment of inertia) of the unknown object about the measurement axis can be determined. This unknown object has a center of gravity (C.G.) which may or may not be located at the measurement axis. If it is, the moment of inertia that has been determined will be the principal axis moment of inertia for the object. If it is not, a larger value will be shown which is composed of the principal MOI plus an $Md^2$ term where M is the mass of the object and d is the distance from the measured axis to the center of gravity of the object. Thus a single period measurement with this system will yield only the MOI of whatever object is placed on the table as seen from the measurement axis. This will be $I_0$ of the object only if the C.G. (center of gravity) coincides with the measurement axis.

To determine the center of gravity (CG) and the moment of inertia ($I_o$) of a test object, the object is securely mounted to the table 46 which is radially offset a distance "$\alpha$" with respect to the axis of rotation (through shaft 16). The table is rotated about its displaced center through 90° increments and locked in position (by index pin 56) at nominal angular values of 0°, 90°, 180° and 270°.

Period measurements are made with the table positioned at 0°, 90° and 180°. The resultant data for this configuration are unique in that only one possible solution for CG and $I_o$ exists. The equations used for calculating center of gravity and moments of inertia from the three period measurements are given below.

INDIVIDUAL MOMENTS OF INERTIA OF MASS ABOUT AXIS OF ROTATION $$I_i = k/4\pi 2(t_i^2 - t_o^2)$$

Where:
k = torsional spring rate
$t_o$ = tare period
$t_i$ = measured period
i = angular displacement of table when measurements are taken
During calibration runs:
$I_1$ = MOI at 0°
$I_2$ = MOI at 90°
$I_3$ = MOI at 180°

CENTER OF GRAVITY (With respect to origin at table center)

$$\overline{X} = \frac{I_3 - I_1}{4\alpha M}$$

$$\overline{Y} = \frac{I_3 - I_1 - 2(I_2 - I_1)}{4\alpha M}$$

MOMENT OF INERTIA OF MASS ABOUT ITS C.G.

$$I_o = I_3 - M[(\alpha + \overline{X})^2 + \overline{Y}^2]$$

MOMENT OF INERTIA OF MASS ABOUT TABLE AXIS $$I_t = I_o + MR^2$$

where $R = \sqrt{\overline{X}^2 + \overline{Y}^2}$

It is to be noted that the component oneshots, counters, timers, etc. are available as off-the-shelf items. By way of example, but not limitation, Table I below lists the correspondence between commercially available modules and the blocks used in the logic circuits herein.

TABLE I

| COMMERCIAL MODULE | LOGIC BLOCK |
| --- | --- |
| DM 74123 | 640, 666, 672, 682, 688, 700 |
| SN 7474 | 617, 850, 852 |
| SN 7475 | 656, 814 |
| SN 7490 | 618, 620, 658, 686 |
| S 7446 | 661, 816 |
| SN 74192 | 812 |
| LM 555 | 704, 858 |
| HP 5082-7650 | 628, 910 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A mass properties measurement apparatus, comprising:
   first and second opposed bearing assemblies, each comprising a fixed bearing and a journal seated in and movable relative to the bearing, the journals of said bearing assemblies being generally part spherically shaped with a generally planar face, the surfaces of the fixed bearings complementing the shape of the associated journals;

rigid connecting means coupled to said first and second journals for substantially securing said journals against movement relative to each other, said connecting means and journals being located relative to said fixed bearings to permit substantially only rotational movement of the journals and connecting means relative to the fixed bearings about a rotational axis, said connecting means including a hollow shaft rigidly secured to the first bearing assembly journal, and a journal preload spring fixed to the second bearing assembly journal, said hollow shaft extending through a central axial bore in said second journal and being secured to said journal preload spring at a location substantially coincident with the radial center of said second journal, whereby said journal preload spring exerts a preloading force between said first and second journals through said hollow shaft;

a support table coupled to said first journal for rotational movement therewith, the plane of the surface of said support table being substantially perpendicular to said rotational axis;

torsion wire means extending substantially along said rotational axis and having an end portion coupled to said support table for rotational movement therewith and its other end portion fixed with one of said bearings against movement relative thereto and against movement with said support table, said torsion wire means controlling oscillatory movement of said support table, said journals, and said connecting means about said rotational axis;

means for limiting the maximum angle through which said support table is rotatable in oscillatory movement; and means for measuring successive periods of oscillation of said support table to determine mass properties of a test object mounted on said support table.

2. Apparatus according to claim 1, wherein;

said journal preload spring has a generally planar face and opposed substantially U-shaped end portions, said journal preload spring being secured by said end portions to the planar face of said second journal such that the generally planar face of the preload spring is spaced from the bearing face and lies in a plane substantially perpendicular to the rotational axis of the apparatus.

3. Apparatus according to claim 1, wherein;

said torsion wire means extends through said hollow shaft, said other end of said torsion wire being fixed to one end portion of a torsion wire preload spring, the other end portion of which is fixed to said bearings, whereby said torsion wire preload spring exerts a force on said support table and first journal through said torsion wire means.

4. A mass properties measurement apparatus, comprising:

first and second opposed gas operated bearing assemblies, each comprising a fixed bearing and a journal seated in and movable relative to the bearing;

rigid connecting means coupled to said first and second journals for substantially securing said journals against movement relative to each other, said connecting means and journals being located relative to said fixed bearings to permit substantially only rotational movement of the journals and connecting means relative to the fixed bearings about a rotational axis;

a support table coupled to said first journal for rotational movement therewith, the plane of the surface of said support table being substantially perpendicular to said rotational axis;

torsion wire means extending substantially along said rotational axis and having an end portion coupled to said support table for rotational movement therewith and its other end portion fixed with one of said bearings against movement relative thereto and against movement with said support table, said torsion wire means controlling oscillatory movement of said support table, said journals, and said connecting means about said rotational axis;

gas supply means for supplying pressurized gas to said bearing assemblies;

caging means fixed with said bearings and engageable with said connecting means;

monitor and control means coupled to said gas supply means and said caging means for causing said caging means to engage said rigid connecting means to prevent rotation of said connecting means when the pressure of the gas from said supply means falls below a predetermined minimum to thereby prevent said bearing assemblies from being damaged due to a reduced gas pressure; and means for measuring successive periods of oscillatory movement of said support table to determine mass properties of a test object mounted on said support table.

5. Apparatus according to claim 4, wherein said caging means comprises:

a cage housing;

means mounting said cage housing to said fixed bearings in such a manner as to permit axial movement of said cage housing relative to said fixed bearings and connecting means;

cage bias means normally biasing said cage housing in one direction;

gas pressure operated piston means located in and axially movable relative to said cage housing, said piston and cage housing together defining a piston chamber;

means coupled to said gas supply means for supplying said pressurized gas to said piston chamber; and piston bias means coupled between said housing and said piston means;

wherein, when said gas supply pressure falls below said predetermined minimum value, said piston bias means urges said piston into engagement with said rigid connecting means and said piston bias means also urges said cage housing into axial movement against the normal biasing of said cage bias means and into locking engagement with said rigid connecting means to thereby prevent further rotational movement of said connecting means and said support table as long as said gas supply pressure remains below said predetermined minimum value.

6. Apparatus according to claim 5, further comprising:

electro-mechanical transducer means having a moveable chamber and a detector for sensing the movement of said moveable member and generating an electrical output as a function of the sensed movement; and a holder rigidly fixed to said connecting means for rigidly securing said movable member to said connecting means for oscillatory movement therewith; wherein:

said cage housing contains an axial bore into which said holder is at least partially slidably received; and said piston contains an axial bore through which said connecting means passes, wherein one end portion of said piston is engageable with said holder when said pressure falls below said predetermined minimum value; and said apparatus further comprises means on said cage housing for engaging said holder to prevent rotation of said connecting means when said gas pressure falls below said predetermined minimum value.

7. Apparatus according to claim 6, wherein;
said holder has a flanged portion containing at least one radially extending substantially V-shaped groove and said means on said cage housing for engaging said holder comprises at least one radially extending pin which seats in said groove.

8. A mass properties measurement apparatus, comprising:
first and second opposed bearing assemblies, each comprising a fixed bearing and a journal seated in and movable relative to the bearing;
rigid connecting means coupled to said first and second journals for substantially securing said journals against movement relative to each other, said connection means and journals being located relative to said fixed bearings to permit substantially only rotational movement of the journals and connecting means relative to the fixed bearings about a rotational axis;
a support table coupled to said first journal for rotational movement therewith, the plane of the surface of said support table being substantially perpendicular to said rotational axis;
torsion wire means extending substantially along said rotational axis and having an end portion coupled to said support table for rotational movement therewith and its other end portion fixed with one of said bearings against movement relative thereto and against movement with said support table, said torsion wire means controlling oscillatory movement of said support table, said journals, and said connecting means about said rotational axis; and
means for measuring successive periods of oscillatory movement of said support table to determine mass properties of a test object mounted on said support table, including first detecting means for detecting successive periods of oscillation of said support table, second detecting means for detecting when the period of oscillation of said support table has decayed to a predetermined maximum measurement period, and means coupled to said first and second detecting means for measuring the average oscillation period during a measurement cycle which comprises a predetermined number of successive oscillation periods commencing after the oscillation periods of said support table have decayed to said predetermined maximum measurement period.

9. Apparatus according to claim 8, wherein:
said first and second detecting means each comprises a transducer for converting the detected oscillatory mechanical movement of said support table into electrical signals;
said first detecting means is located approximately at a position at which said support table exhibits maximum kinetic energy during a given oscillation period; and
said second detecting means is angularly offset from the location of the first detecting means along the path of oscillatory movement of said support table.

10. Apparatus according to claim 8, wherein said measuring means further comprises:
clock means for generating clock pulses at a predetermined frequency;
counter means for counting said clock pulses;
first control means coupled to said second detecting means and coupled between said clock means and counter means, said first control means including means for clearing said counter means between successive detected oscillation periods until said predetermined maximum measurement period has been detected, and means for inhibiting said clearing means during a measurement cycle; and
second control means coupled to said first detecting means and coupled between said clock means and counter means for counting the number of oscillation periods detected by said first detecting means and for inhibiting the passage of further clock pulses to said counter means after a predetermined maximum number of oscillation periods has been detected and counted.

11. Apparatus according to claim 10, further comprising:
means for selecting the number of oscillation periods comprising a measurement cycle; and
means for dividing the clock pulse frequency by the number of oscillation periods selected;
said counter means counting the total number of divided clock pulses generated during the measurement cycle.

12. Apparatus according to claim 11, wherein:
said clock pulse generating means comprises means for generating a slow clock frequency and means for generating a fast clock frequency which is a predetermined multiple of the slow clock frequency;
said apparatus further comprising:
clock selecting means coupled to said first detecting means for selecting said fast or slow clock frequency as a function of the duration of a detected oscillation period and passing the selected clock frequency to said divider means during said measurement cycle.

13. Apparatus according to claim 12, further comprising:
means coupled to said clock selection means for maintaining the clock frequency selected immediately prior to detection of the predetermined maximum measurement period by said second detecting means for the duration of the measurement cycle.

14. Apparatus according to claim 12, further comprising:
display means coupled to said counter means for displaying the measured average oscillation period of said support table.

15. Apparatus according to claim 14, wherein:
said display means displays each measured period until said second detecting means detects said maximum measurement period;

said apparatus further comprising:
means coupled to said display means for locking the display means during the measurement cycle and for thereafter displaying the measured average oscillation period.

16. A mass properties measurement apparatus which is relatively independent of its spatial orientation, comprising:
first and second opposed bearing assemblies, each comprising a fixed bearing and a journal seated in and movable relative to the bearing;
rigid connecting means coupled to said first and second journals for substantially securing said journals against movement relative to each other, said connecting means and journals being located relative to said fixed bearings to permit substantially only rotational movement of the journals and connecting means relative to the fixed bearings about a rotational axis;
a support table coupled to said first journal for rotational movement therewith, the plane of the surface of said support table being substantially perpendicular to said rotational axis;
torsion wire means extending substantially along said rotational axis and having an end portion coupled to said support table for rotational movement therewith and its other end portion fixed with one of said bearings against movement relative thereto and against movement with said support table, said torsion wire means controlling oscillatory movement of said support table, said journals, and said connecting means about said rotational axis;
means for measuring successive periods of oscillation of said support table to determine mass properties of a test object mounted on said support table; and
means mounting said support table to said first journal such that said support table is selectively adjustable relative to said first journal to permit said support table and a test object mounted thereon to be rotated about said rotational axis between oscillation period measurements.

17. Apparatus according to claim 16, wherein;
said support table is generally circular and is mounted to said first journal such that the center of said support table is laterally offset a predetermined distance from the rotational axis of the measurement apparatus.

18. Apparatus according to claim 17, further comprising:
a counterweight fixed to said first journal for balancing the weight of the offset mounted support table under no load conditions.

19. Apparatus according to claim 16, wherein:
the journals of said bearing assemblies are generally part spherically shaped with a generally planar face, the surfaces of the fixed bearings complementing the shape of the associated journals;
said connecting means comprises a hollow shaft rigidly secured to the first bearing assembly journal;
a journal preload spring is fixed to the second bearing assembly journal; and
said hollow shaft extends through a central axial bore in said second journal and is secured to said journal preload spring at a location substantially coincident with the radial center of said second journal, whereby said preload spring exerts a preloading force between said first and second journals through said hollow shaft.

20. Apparatus according to claim 19, further comprising:
a holder rigidly fixed to said shaft; and
a pair of fine adjusting screws mounted to said holder and extending outward from the rotational axis, said fine adjustment screws being independently movable toward and away from said rotational axis along lines which intersect said rotational axis substantially at a common point to rotationally balance the measurement apparatus under no-load conditions.

21. Apparatus according to claim 20, further comprising:
electro-mechanical transducer means having a movable member and a detector for sensing the movement of said movable member and generating an electrical output as a function of the sensed movement;
said movable member being rigidly secured to said holder such that the longitudinal axis of said movable member substantially bisects the angle between the lines along which said fine adjusting screws are movable.

22. Apparatus according to claim 21, further comprising:
a counterweight fixed to said first journal for balancing the weight of the offset mounted support table under no-load conditions.

23. Apparatus according to claim 16, wherein said means for measuring successive periods of oscillation of said support table comprises:
first detecting means for detecting successive periods of oscillation of said support table;
second detecting means for detecting when the period of oscillation of said support table has decayed to a predetermined maximum measurement period; and
means coupled with said first and second detecting means for measuring the average oscillation period during a measurement cycle which comprises a predetermined number of successive oscillation periods commencing after the oscillation periods of said support table have decayed to said predetermined maximum measurement period.

24. Apparatus according to claim 23, wherein:
said first and second detecting means each comprises a transducer for converting the detected oscillatory mechanical movement of said support table into electrical signals;
said first detecting means is located approximately at a position at which said support table exhibits maximum kinetic energy during a given oscillation period; and
said second detecting means is angularly offset from the location of the first detecting means along the path of oscillatory movement of said support table.

25. Apparatus according to claim 23, wherein said measuring means further comprises:
clock means for generating clock pulses at a predetermined frequency;
counter means for counting said clock pulses;
first control means coupled to said second detecting means and coupled between said clock means and counter means, said first control means including means for clearing said counter means between successive detected oscillation periods until said predetermined maximum measurement period has been detected, and means for inhibiting said clearing means during a measurement cycle; and second control means coupled to said first detecting means and coupled between said clock means and counter means for counting the number of oscillation periods detected by said first detecting means and for inhibiting the passage of further clock pulses to said counter means after a predetermined maximum number of oscillation periods has been detected and counted.

26. Apparatus according to claim 25, further comprising:

means for selecting the number of oscillation periods comprising a measurement cycle; and means for dividing the clock pulse frequency by the number of oscillation periods selected;

said counter means counting the total number of divided clock pulses generated during the measurement cycle.

27. Apparatus according to claim 26, wherein:

said clock pulse generating means comprises means for generating a slow clock frequency and means for generating a fast clock frequency which is a predetermined multiple of the slow clock frequency;

said apparatus further comprising:

clock selecting means coupled to said first detecting means for selecting said fast or slow clock frequency as a function of the duration of a detected oscillation period and passing the selected clock frequency to said divider means during said measurement cycle.

28. Apparatus according to claim 27, further comprising:

means coupled to said clock selection means for maintaining the clock frequency selected immediately prior to detection of the predetermined maximum measurement period by said second detecting means for the duration of the measurement cycle.

29. Apparatus according to claim 27, further comprising:

display means coupled to said counter means for displaying the measured average oscillation period of said support table.

30. Apparatus according to claim 29, wherein:

said display means displays each measured period until said second detecting means detects said maximum measurement period;

said apparatus further comprising:

means coupled to said display means for locking the display means during the measurement cycle and for thereafter displaying the measured average oscillation period.

31. A mass properties measurement apparatus which is relatively independent of its spatial orientation, comprising:

first and second opposed bearing assemblies, each comprising a fixed bearing and a journal seated in and movable relative to the bearing;

rigid connecting means coupled to said first and second journals for substantially securing said journals against movement relative to each other, said connecting means and journals being located relative to said fixed bearings to permit substantially only rotational movement of the journals and connecting means relative to the fixed bearings about a rotational axis;

a support table coupled to said first journal for rotational movement therewith, the plane of the surface of said support table being substantially perpendicular to said rotational axis;

torsion wire means extending substantially along said rotational axis and having an end portion coupled to said support table for rotational movement therewith and its other end portion fixed with one of said bearings against movement relative thereto and against movement with said support table, said torsion wire means controlling oscillatory movement of said support table said journals and said connecting means about said rotational axis;

means for limiting the maximum angle through which said support table is rotatable in oscillatory movement;

means for measuring successive periods of oscillation of said support table to determine mass properties of a test object mounted on said support table;

means mounting said support table to said first journal such that said support table is selectively adjustable relative to said first journal to permit said support table and a test object mounted thereon to be rotated about the rotational axis of the apparatus between oscillation period measurements;

a holder rigidly fixed to said connecting means; and a pair of fine adjusting screws mounted to said holder and extending outward from the rotational axis, said fine adjustment screws being independently movable toward and away from said rotational axis along lines which intersect said rotational axis substantially at a common point to rotationally balance the measurement apparatus under no-load conditions.

32. Apparatus according to claim 31, wherein said bearing assemblies are gas operated bearing assemblies, said apparatus further comprising;

gas supply means for supplying pressurized gas to said bearing assemblies;

caging means fixed with said bearings and engageable with said connecting means; and monitor and control means coupled to said gas supply means and said caging means for causing said caging means to engage said rigid connecting means to prevent rotation of said connecting means when the pressure of the gas from said supply mean falls below a predetermined minimum to thereby prevent said bearing assemblies from being damaged due to a reduced gas pressure.

33. Apparatus according to claim 32, wherein said caging means comprises:

a cage housing;

means mounting said cage housing to said fixed bearings in such a manner as to permit axial movement of said cage housing relative to said fixed bearings and connecting means;

cage bias means normally biasing said cage housing in one direction;

gas pressure operated piston means located in an axially movable relative to said cage housing, said piston and cage housing together defining a piston chamber;

means coupled to said gas supply means for supplying said pressurized gas to said piston chamber; and piston bias means coupled between said housing and said piston means;

wherein, when said gas supply pressure falls below said predetermined minimum value, said piston bias means urges said piston into engagement with said rigid connecting means and said piston bias means also urges said cage housing into axial movement against the normal biasing of said cage bias means and into locking engagement with said rigid connecting means to thereby prevent further rotational movement of said connecting means and said support table as long as said gas supply pressure remains below said predetermined minimum value.

34. Apparatus according to claim 33, wherein:
the journals of said bearing assemblies are generally part spherically shaped with a generally planar face, the surfaces of the fixed bearings complementing the shape of the associated journals;
said connecting means comprises a hollow shaft rigidly secured to the first bearing assembly journal;
a journal preload spring is fixed to the second bearing assembly journal; and
said hollow shaft extends through a central axial bore in said second journal and is secured to said journal preload spring at a location substantially coincident with the radial center of said second journal, whereby said preload spring exerts a preloading force between said first and second journals through said hollow shaft.

35. Apparatus according to claim 34, wherein; said journal preload spring has a generally planar face and opposed substantially U-shaped end portions, said journal preload spring being secured by said end portions to the planar face of said second journal such that the generally planar face of the preload spring is spaced from the bearing face and lies in a plane substantially perpendicular to the rotational axis of the apparatus.

36. Apparatus according to claim 34, wherein;
said torsion wire means extends through said hollow shaft, said other end of said torsion wire being fixed to one end portion of a torsion wire preload spring, the other end portion of which is fixed to said bearings, whereby said torsion wire preload spring exerts a force on said support table and first journal through said torsion wire means.

37. Apparatus according to claim 31, wherein said means for measuring successive periods of oscillation of said support table comprises:
first detecting means for detecting successive periods of oscillation of said support table;
second detecting means for detecting when the period of oscillation of said support table has decayed to a predetermined maximum measurement period; and
means coupled with said first and second detecting means for measuring the average oscillation period during a measurement cycle which comprises a predetermined number of successive oscillation periods commencing after the oscillation periods of said support table have decayed to said predetermined maximum measurement period.

38. Apparatus according to claim 37, wherein:
said first and second detecting means each comprises a transducer for converting the detected oscillatory mechanical movement of said support table into electrical signals;
said first detecting means is located approximately at a position at which said support table exhibits maximum kinetic energy during a given oscillation period; and said second detecting means is angularly offset from the location of the first detecting means along the path of oscillatory movement of said support table.

39. Apparatus according to claim 37, wherein said measuring means further comprises:
clock means for generating clock pulses at a predetermined frequency;
counter means for counting said clock pulses;
first control means coupled to said second detecting means and coupled between said clock means and counter means, said first control means including means for clearing said counter means between successive detected oscillation periods until said predetermined maximum measurement period has been detected, and means for inhibiting said clearing means during a measurement cycle; and
second control means coupled to said first detecting means and coupled between said clock means and counter means for counting the number of oscillation periods detected by said first detecting means and for inhibiting the passage of further clock pulses to said counter means after a predetermined maximum number of oscillation periods has been detected and counted.

40. Apparatus according to claim 39, further comprising:
means for selecting the number of oscillation periods comprising a measurement cycle; and
means for dividing the clock pulse frequency by the number of oscillation periods selected;
said counter means counting the total number of divided clock pulses generated during the measurement cycle.

41. Apparatus according to claim 40, wherein:
said clock pulse generating means comprises means for generating a slow clock frequency and means for generating a fast clock frequency which is a predetermined multiple of the slow clock frequency;
said apparatus further comprising;
clock selecting means coupled to said first detecting means for selecting said fast or slow clock frequency as a function of the duration of a detected oscillation period and passing the selected clock frequency to said divider means during said measurement cycle.

42. Apparatus according to claim 41, further comprising:
means coupled to said clock selection means for maintaining the clock frequency selected immediately prior to detection of the predetermined maximum measurement period by said second detecting means for the duration of the measurement cycle.

43. Apparatus according to claim 41, further comprising:
display means coupled to said counter means for displaying the measured average oscillation period of said support table.

44. Apparatus according to claim 43, wherein:
said display means displays each measured period until said second detecting means detects said maximum measurement period;
said apparatus further comprising:
means coupled to said display means for locking the display means during the measurement cycle and for thereafter displaying the measured average oscillation period.

45. A mass properties measurement apparatus, comprising:
oscillatory means for oscillating a test object about a rest position;
first detecting means for detecting successive periods of oscillation of said oscillatory means;
second detecting means for detecting when the period of oscillation of said oscillatory means has decayed to a predetermined maximum measurement period; and
means coupled with said first and second detecting means for measuring the average oscillation period during a measurement cycle which comprises a predetermined number of successive oscillation periods commencing after the oscillation periods of said oscillatory means have decayed to said predetermined maximum measurement period.

46. Apparatus according to claim 45, wherein:
said first and second detecting means each comprises a transducer for converting the detected oscillatory mechanical movement of said oscillatory means into electrical signals;
said first detecting means is located approximately at a position at which said oscillatory means exhibits maximum kinetic energy during a given oscillation period; and
said second detecting means is angularly offset from the location of the first detecting means along the path of oscillatory movement of said oscillatory means.

47. Apparatus according to claim 45, wherein said measuring means further comprises:
clock means for generating clock pulses at a predetermined frequency;
counter means for counting said clock pulses;
first control means coupled to said second detecting means and coupled between said clock means and counter means, said first control means including means for clearing said counter means between successive detected oscillation periods until said predetermined maximum measurement period has been detected, and means for inhibiting said clearing means during a measurement cycle; and
second control means coupled to said first detecting means and coupled between said clock means and counter means for counting the number of oscillation periods detected by said first detecting means and for inhibiting the passage of further clock pulses to said counter means after a predetermined maximum number of oscillation periods has been detected and counted.

48. Apparatus according to claim 47, further comprising:
means for selecting the number of oscillation periods comprising a measurement cycle; and
means for dividing the clock pulse frequency by the number of oscillation periods selected;
said counter means counting the total number of divided clock pulses generated during the measurement cycle.

49. Apparatus according to claim 48, wherein:
said clock pulse generating means comprises means for generating a slow clock frequency and means for generating a fast clock frequency which is a predetermined multiple of the slow clock frequency;
said apparatus further comprising:
clock selecting means coupled to said first detecting means for selecting said fast or slow clock frequency as a function of the duration of a detected oscillation period and passing the selected clock frequency to said divider means during said measurement cycle.

50. Apparatus according to claim 49, further comprising:
means coupled to said clock selection means for maintaining the clock frequency selected immediately prior to detection of the predetermined maximum measurement period by said second detecting means for the duration of the measurement cycle.

51. Apparatus according to claim 49, further comprising:
display means coupled to said counter means for displaying the measured average oscillation period of said oscillatory means.

52. Apparatus according to claim 51, wherein:
said display means displays each measured period until said second detecting means detects said maximum measurement period;
said apparatus further comprising:
means coupled to said display means for locking the display means during the measurement cycle and for thereafter displaying the measured average oscillation period.

* * * * *